US010954328B2

(12) United States Patent
Crowther et al.

(10) Patent No.: US 10,954,328 B2
(45) Date of Patent: Mar. 23, 2021

(54) POLYMERIZATION PROCESSES

(71) Applicant: ExxonMobil Chemical Patents Inc., Baytown, TX (US)

(72) Inventors: Donna J. Crowther, Blairsville, GA (US); Timothy M. Boller, Houston, TX (US); Richard B. Pannell, Liberty, TX (US); Jeanette M. Diop, Houston, TX (US); Wen Li, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 154 days.

(21) Appl. No.: 16/191,375

(22) Filed: Nov. 14, 2018

(65) Prior Publication Data

US 2019/0144579 A1 May 16, 2019

Related U.S. Application Data

(60) Provisional application No. 62/586,403, filed on Nov. 15, 2017.

(51) Int. Cl.
*C08F 4/76* (2006.01)
*C08F 4/64* (2006.01)
*C08F 210/00* (2006.01)
*C08F 210/16* (2006.01)
*C08F 2/14* (2006.01)
*C08F 4/659* (2006.01)

(52) U.S. Cl.
CPC .............. *C08F 210/16* (2013.01); *C08F 2/14* (2013.01); *C08F 4/659* (2013.01); *C08F 4/65912* (2013.01); *C08F 4/65916* (2013.01)

(58) Field of Classification Search
CPC ............. C08F 210/16; C08F 4/64; C08F 4/76
See application file for complete search history.

(56) References Cited

U.S. PATENT DOCUMENTS

| | | | |
|---|---|---|---|
| 5,281,679 A | 1/1994 | Jejelowo et al. | |
| 5,525,678 A | 6/1996 | Mink et al. | |
| 5,756,416 A | 5/1998 | Wasserman et al. | |
| 6,242,545 B1 | 6/2001 | Jejelowo et al. | |
| 6,248,845 B1 | 6/2001 | Loveday et al. | |
| 6,372,864 B1 | 4/2002 | Brown | |
| 6,528,597 B2 | 3/2003 | Loveday et al. | |
| 6,911,516 B1 | 6/2005 | Mihan et al. | |
| 6,936,675 B2 | 8/2005 | Szul et al. | |
| 6,956,088 B2 | 10/2005 | Farley et al. | |
| 7,078,467 B1 | 7/2006 | Kolb et al. | |
| 7,172,816 B2 | 2/2007 | Szul et al. | |
| 7,179,876 B2 | 2/2007 | Szul et al. | |
| 7,381,783 B2 | 6/2008 | Loveday et al. | |
| 8,247,065 B2 | 8/2012 | Best et al. | |
| 8,378,043 B2 | 2/2013 | Graham et al. | |
| 8,476,392 B2 | 7/2013 | Kolb et al. | |
| 9,290,593 B2 | 3/2016 | Cho et al. | |
| 2002/0165330 A1 | 11/2002 | Cady et al. | |
| 2003/0096128 A1 | 5/2003 | Farley et al. | |
| 2003/0213938 A1 | 11/2003 | Farley et al. | |
| 2005/0282980 A1 | 12/2005 | Szul et al. | |
| 2006/0178491 A1 | 8/2006 | Canich | |
| 2006/0189769 A1 | 8/2006 | Hoang et al. | |
| 2006/0281878 A1 | 12/2006 | Kolb et al. | |
| 2008/0021183 A1 | 1/2008 | Graham et al. | |
| 2009/0088537 A1 | 4/2009 | Yang et al. | |
| 2009/0306323 A1 | 12/2009 | Kolb et al. | |
| 2010/0144989 A1 | 6/2010 | Kolb et al. | |
| 2010/0332433 A1 | 12/2010 | Lewalle | |
| 2011/0212315 A1 | 9/2011 | Fantinel et al. | |
| 2011/0217537 A1 | 9/2011 | Fantinel et al. | |
| 2011/0223406 A1 | 9/2011 | Fantinel et al. | |
| 2012/0329965 A1 | 12/2012 | Lee et al. | |
| 2013/0345377 A1 | 12/2013 | Ker et al. | |
| 2014/0155561 A1 | 6/2014 | Ker et al. | |
| 2014/0213747 A1 | 7/2014 | Hlavinka | |
| 2015/0291748 A1 | 10/2015 | Malakoff | |
| 2015/0368377 A1 | 12/2015 | Lester et al. | |
| 2016/0347874 A1* | 12/2016 | Boller | C08F 4/65904 |

FOREIGN PATENT DOCUMENTS

| | | |
|---|---|---|
| FR | 2269541 A | 11/1975 |
| JP | 2013001737 A | 1/2013 |
| WO | 92/15619 A | 9/1992 |
| WO | 96/09328 A | 3/1996 |
| WO | 03/008468 A | 1/2003 |
| WO | 2014/123598 A | 8/2014 |
| WO | 2015/123165 A | 8/2015 |
| WO | WO 2016/17219 A1 | 10/2016 |
| WO | WO 2016/168700 A1 | 10/2016 |

OTHER PUBLICATIONS

US 5,625,016 A, 04/1997, Schiffino et al. (withdrawn)
Chitta, Rajesh, et al., "Characterization of the Chemical Composition Distribution of Ethylene/1-Alkene Copolymers with HPLC and CRYSTAF-Comparison of Results", Macromolecular Chemistry and Physics, vol. 216, Issue 7, pp. 721-732, (2015).
Choi, Yiyoung, et al. "Supported hybrid early and late transition metal catalysts for the synthesis of polyethylene with tailored molecular weight and chemical composition distributions", Polymer Journal, vol. 51, Issue 21, pp. 4713-4725, (2010).
Mortazavi, S. Mohammad M, et al., "Copolymerization of ethylene/ α-olefins using bis(2-phenylindenyl)zirconium dichloride metallocene catalyst: structural study of comonomer distribution", Polymer International, vol. 59, Issue 9, pp. 1258-1265, (2009).

(Continued)

Primary Examiner — Rip A Lee
(74) Attorney, Agent, or Firm — ExxonMobil Chemical Patents Inc.—Law Department

(57) ABSTRACT

Polymerization processes to produce polyolefin polymers, for example, polyethylene polymers, from catalyst systems comprising one or more olefin polymerization catalysts and at least one activator are provided. The polyolefin polymers may have a Broad Orthogonal Composition Distribution (BOCD).

25 Claims, 6 Drawing Sheets

(56) References Cited

OTHER PUBLICATIONS

Yoon, Keun-Byoung, et al., "Copolymerization of Ethylene and 1-Hexene Using (n-BuCp)2ZrCl2 Catalyst Activated by the Cross-linked MAO Supported Cocatalyst", Macromolecular Research, vol. 14, Issue 2, pp. 240-244, (2006).

Bialek, Marzena, et al., "Studies of structural composition distribution heterogeneity in ethylene/1-hexene copolymers using thermal fractionation technique (SSA) Effect of catalyst structure", vol. 429, Issue 2, pp. 149-154, (2005).

Galland, Griselda B., et al., "Evaluation of silica-supported zirconocenes in ethylene/1-hexene copolymerization", vol. 189, Issue 2, pp. 233-240, (2002).

Starck, P., et al., "Thermal Characterization of Ethylene Polymers Prepared with Metallocene Catalysts", vol. 39, Issue 8, pp. 1444-1455, (1999).

* cited by examiner

POLYMERIZATION PROCESSES

CROSS-REFERENCE OF RELATED APPLICATIONS

This application claims the benefit of Ser. No. 62/586,403, filed on Nov. 15, 2017, the disclosure of which is incorporated herein by reference in its entirety.

FIELD OF THE INVENTION

The present disclosure relates to polymerization processes to produce polyolefin polymers from catalyst systems comprising one or more olefin polymerization catalysts and at least one activator.

BACKGROUND OF THE INVENTION

Supported olefin polymerization catalysts are of great use in industry to produce polyolefin polymers and these polymers have revolutionized virtually every aspect of the modern world. Hence, there is strong interest in finding new supported catalyst systems to use in polymerization processes that increase the commercial usefulness of the catalyst systems and allow the production of polyolefin polymers having improved properties or a new combination of properties.

In particular, much effort has been placed in understanding how the comonomer is distributed along the polymer carbon chain or simply polymer chain of a polyolefin polymer. For example, the composition distribution of an ethylene alpha-olefin copolymer refers to the distribution of comonomer (short chain branches) among the molecules that comprise the polyethylene polymer. When the amount of short chain branches varies among the polymer carbon chain, the polymer or resin is said to have a Broad Composition Distribution (BCD). When the amount of comonomer per about 1000 carbons is similar among the polyethylene molecules of different polymer chain lengths or molecular weights, the composition distribution is said to be "narrow" or have a Narrow Composition Distribution (NCD).

The composition distribution is known to influence the properties of copolymers, for example, extractables content, environmental stress crack resistance, heat sealing, dart drop impact resistance, and tear resistance or strength. The composition distribution of a polyolefin may be readily measured by methods known in the art, for example, Temperature Raising Elution Fractionation (TREF) or Crystallization Analysis Fractionation (CRYSTAF). See, for example, U.S. Pat. No. 8,378,043, Col. 3 and Col. 4.

Ethylene alpha-olefin copolymers may be produced in a low pressure reactor, utilizing, for example, solution, slurry, and/or gas phase polymerization processes. Polymerization takes place in the presence of activated catalyst systems such as those employing a Ziegler-Natta catalyst, a chromium based catalyst, a vanadium catalyst, a metallocene catalyst, a mixed catalyst (i.e., two or more different catalysts co-supported on the same carrier such as a bimodal catalyst), other advanced catalysts, or combinations thereof. In general, these catalysts when used in a catalyst system all produce a variety of polymer chains in a polyolefin polymer composition that vary in molecular weight and comonomer incorporation. In some cases, this variation becomes a "signature" to the catalyst itself For example, it is generally known in the art that a polyolefin's composition distribution is largely dictated by the type of catalyst used. For example, Broad Composition Distribution or BCD refers to polymers in which the length of the molecules would be substantially the same but the amount of the comonomer would vary along the length, for example, for an ethylene-hexene copolymer, hexene distribution varies from low to high while the molecular weight is roughly the same or the Polydispersity Index (PDI) is narrow.

Polymers made with Zeigler Natta catalysts are considered to be "conventional" in which the composition distribution is broad but the high molecular weight fractions are higher density (i.e., less comonomer) than the lower molecular weight fraction (high comonomer).

In contrast, metallocene catalysts typically produce a polyolefin polymer composition with an NCD. A metallocene catalyst is generally a metal complex of a transitional metal, typically, a Group 4 metal, and one or more cyclopentadienyl (Cp) ligands or rings. As stated above, NCD generally refers to the comonomer being evenly distributed or not vary much along the polymer chain. An illustration is provided in FIG. 6a.

More recently, a third distribution has been described for a polyolefin polymer composition having a Broad Orthogonal Composition Distribution (BOCD) in which the comonomer is incorporated predominantly in the high molecular weight chains. A substituted hafnocene catalyst has been noted to produce this type of distribution. See, for example, U.S. Pat. Nos. 6,242,545; 6,248,845; 6,528,597; 6,936,675; 6,956,088; 7,172,816; 7,179,876; 7,381,783; 8,247,065; 8,378,043; 8,476,392; and U.S. Publication No. 2015/0291748. An illustration is provided in FIG. 6b. This distribution has been noted for its improved physical properties, for example, ease in fabrication of end-use articles as well as stiffness and toughness in multiple applications such as films that can be measured by dart drop impact resistance and tear resistance or strength.

As taught by U.S. Pat. No. 8,378,043, BOCD refers to incorporating the comonomer predominantly in the high molecular weight chains. The distribution of the short chain branches can be measured, for example, using Temperature Raising Elution Fractionation (TREF) in connection with a Light Scattering (LS) detector to determine the weight average molecular weight of the molecules eluted from the TREF column at a given temperature. The combination of TREF and LS (TREF-LS) yields information about the breadth of the composition distribution and whether the comonomer content increases, decreases, or is uniform across the chains of different molecular weights.

In another patent, U.S. Pat. No. 9,290,593 ('593 Patent) teaches that the term "BOCD" is a novel terminology that is currently developed and relates to a polymer structure. The term "BOCD structure" means a structure in which the content of the comonomer such as alpha olefins is mainly high at a high molecular weight main chain, that is, a novel structure in which the content of a short chain branching (SCB) is increased as moving toward the high molecular weight. The '593 Patent also teaches a BOCD Index. The BOCD Index may be defined by the following Equation 1:

$$\text{BOCD Index} = \frac{\text{(Content of SCB at the high molecular weight side} - \text{Content of SCB at the low molecular weight side)}}{\text{(Content of SCB at the low molecular weight side)}} \quad [\text{Equation 1}],$$

wherein the "Content of SCB at the high molecular weight side" means the content of the SCB (the number of branches/1000 carbon atoms) included in a polymer chain having a molecular weight of Mw of the polyolefin or more and 1.3×Mw or less, and the "Content of SCB at the low molecular weight side" means the content of the SCB (the number of branches/1000 carbon atoms) included in a polymer chain having a molecular weight of 0.7×Mw of the polyolefin or more and less than Mw. The BOCD Index defined by Equation 1 may be in the range of 1 to 5, preferably 2 to 4, more preferably 2 to 3.5. See, also, FIG. 1 and FIG. 2 of the '593 Patent (characterizing BOCD polymer structures using GPC-FTIR data).

It was commonly believed that not all metallocene catalysts could produce polyolefin polymer compositions having BOCD with the exception of the hafnocenes described above and their zirconocene analogues. One possible explanation for this belief was that commercial, and even lab data, suggested that polymerization process conditions required a narrow operation window of a temperature range of from 75° C. to 85° C. to give the best film properties and the polymerization temperatures suggested in much of the prior art, if not all, taught that the polymerization temperature could vary from anywhere around 0° C. up to 120° C. or 150° C. See, for example, U.S. Pat. No. 8,378,043 at col. 10, lines 14-17, Table 1, Table 3, and claim 1; U.S. Pat. No. 8,476,392 at col. 10, lines 1-7, Table 2, and Table 5; and the other references cited above suggesting substantially the same temperatures.

However, there remains a need in the art for new polymerization processes that can produce polyolefin polymers having BOCD that are not confined to such a narrow operating window, and/or polymerization processes that can produce novel polyolefin polymers having a BOCD along with other polymer properties.

SUMMARY OF THE INVENTION

In a class of embodiments, the invention provides for a polymerization process to produce a polyethylene polymer, the process comprising contacting a catalyst system comprising the product of the combination of one or more olefin polymerization catalysts, at least one activator, and at least one support, with ethylene and one or more $C_3$-$C_{10}$ alpha-olefin comonomers under polymerizable conditions including a temperature range of from 10° C. to 75° C., to produce the polyethylene polymer; wherein the polyethylene polymer has a broad orthogonal composition distribution (BOCD) and wherein the catalyst system comprises at least one non-metallocene olefin polymerization catalyst.

Other embodiments of the invention are described and claimed herein and are apparent by the following disclosure.

BRIEF DESCRIPTION OF THE DRAWINGS

FIG. 2 depicts GPC-SCB plots for Catalyst Example 1, Table 3 entries 1A and 1B. FIG. 3 depicts GPC-SCB plots for Catalyst Example 1, Table 3 entries 1C, 1D, and 1E. FIG. 4 depicts GPC-SCB plots for Catalyst Example 2, Table 4 entries 2A, 2B. FIG. 5 depicts GPC-SCB plots for Catalyst Example 2, Table 4 entries 2C, 2D, and 2E.

DETAILED DESCRIPTION

Figure 1:
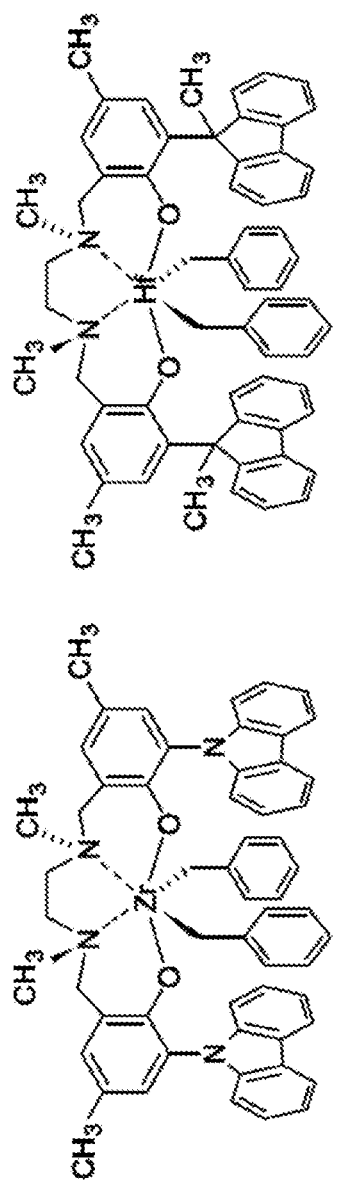
FIG. 1 depicts the chemical structures of Catalyst Example 1 (zirconium complex) and Catalyst Example 2 (hafnium complex).

Before the present compounds, components, compositions, and/or methods are disclosed and described, it is to be understood that unless otherwise indicated this invention is not limited to specific compounds, components, compositions, reactants, reaction conditions, ligands, metallocene structures, catalyst structures, or the like, as such may vary, unless otherwise specified. It is also to be understood that the terminology used herein is for the purpose of describing particular embodiments only and is not intended to be limiting.

In several classes of embodiments of the invention, the present disclosure is directed to catalyst systems and their use in polymerization processes to produce polyolefin polymers such as polyethylene polymers and polypropylene polymers. In another class of embodiments, the present disclosure is directed to polymerization processes to produce polyolefin polymers from catalyst systems comprising the product of the combination of one or more olefin polymerization catalysts, at least one activator, and at least one support.

In particular, the present disclosure is directed to a polymerization process to produce a polyethylene polymer, the process comprising contacting a catalyst system comprising the product of the combination of one or more olefin polymerization catalysts, at least one activator, and at least one support, with ethylene and one or more $C_3$-$C_{10}$ alpha-olefin comonomers under polymerizable conditions including a temperature range of from 10° C. to 75° C., to produce the polyethylene polymer; wherein the polyethylene polymer has a broad orthogonal composition distribution (BOCD) and wherein the catalyst system comprises at least one non-metallocene olefin polymerization catalyst.

In any of the embodiments described herein, polymerizable conditions may include a temperature range of from a lower limit of 5° C., 10° C., 15° C., 20° C., 25° C., 30° C., 35° C., or 40° C., to an upper limit of 45° C., 50° C., 55° C., 60° C., 65° C., 75° C., or 80° C., where any lower limit may be combined with any up limit to form a range. For example, polymerizable conditions may include a temperature range of from 10° C. to 75° C., from 10° C. to 70° C., from 10° C. to 65° C., from 20° C. to 65° C., from 20° C. to 60° C., or 35° C. to 55° C.

Definitions

For purposes of this invention and the claims hereto, the numbering scheme for the Periodic Table Groups is according to the new notation of the IUPAC Periodic Table of Elements.

As used herein, "olefin polymerization catalyst(s) refers to any catalyst, typically an organometallic complex or compound that is capable of coordination polymerization addition where successive monomers are added in a monomer chain at the organometallic active center.

The terms "substituent," "radical," "group," and "moiety" may be used interchangeably.

As used herein, and unless otherwise specified, the term "$C_n$" means hydrocarbon(s) having n carbon atom(s) per molecule, wherein n is a positive integer.

As used herein, and unless otherwise specified, the term "hydrocarbon" means a class of compounds containing hydrogen bound to carbon, and encompasses (i) saturated hydrocarbon compounds; (ii) unsaturated hydrocarbon compounds; and (iii) mixtures of hydrocarbon compounds (saturated and/or unsaturated), including mixtures of hydrocarbon compounds having different values of n.

The terms "hydrocarbyl radical," "hydrocarbyl," "hydrocarbyl group," "alkyl radical," and "alkyl" are used interchangeably throughout this document. Likewise, the terms "group," "radical," and "substituent," are also used interchangeably in this document. For purposes of this disclosure, "hydrocarbyl radical" is defined to be $C_1$-$C_{100}$ radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least one heteroatom or heteroatom containing group, such as halogen (such as Br, Cl, F or I) or at least one functional group such as $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$, and the like, or where at least one heteroatom has been inserted within a hydrocarbyl ring.

As used herein, and unless otherwise specified, the term "alkyl" refers to a saturated hydrocarbon radical having from 1 to 12 carbon atoms (i.e., $C_1$-$C_{12}$ alkyl), particularly from 1 to 8 carbon atoms (i.e., $C_1$-$C_8$ alkyl), particularly from 1 to 6 carbon atoms (i.e., $C_1$-$C_6$ alkyl), and particularly from 1 to 4 carbon atoms (i.e., $C_1$-$C_4$ alkyl). Examples of alkyl groups include, but are not limited to, methyl, ethyl, propyl, butyl, pentyl, hexyl, heptyl, octyl, decyl, and so forth. The alkyl group may be linear, branched or cyclic. "Alkyl" is intended to embrace all structural isomeric forms of an alkyl group. For example, as used herein, propyl encompasses both n-propyl and isopropyl; butyl encompasses n-butyl, sec-butyl, isobutyl and tert-butyl and so forth. As used herein, "$C_1$ alkyl" refers to methyl (—$CH_3$), "$C_2$ alkyl" refers to ethyl (—$CH_2CH_3$), "$C_3$ alkyl" refers to propyl (—$CH_2CH_2CH_3$) and "$C_4$ alkyl" refers to butyl (e.g., —$CH_2CH_2CH_2CH_3$, —$(CH_3)CHCH_2CH_3$, —$CH_2CH(CH_3)_2$, etc.). Further, as used herein, "Me" refers to methyl, and "Et" refers to ethyl, "i-Pr" refers to isopropyl, "t-Bu" refers to tert-butyl, and "Np" refers to neopentyl.

As used herein, and unless otherwise specified, the term "alkylene" refers to a divalent alkyl moiety containing 1 to 12 carbon atoms (i.e., $C_1$-$C_{12}$ alkylene) in length and meaning the alkylene moiety is attached to the rest of the molecule at both ends of the alkyl unit. For example, alkylenes include, but are not limited to, —$CH_2$—, —$CH_2CH_2$—, —$CH(CH_3)CH_2$—, —$CH_2CH_2CH_2$-, etc. The alkylene group may be linear or branched.

As used herein, and unless otherwise specified, the term "alkenyl" refers to an unsaturated hydrocarbon radical having from 2 to 12 carbon atoms (i.e., $C_2$-$C_{12}$ alkenyl), particularly from 2 to 8 carbon atoms (i.e., $C_2$-$C_8$ alkenyl), particularly from 2 to 6 carbon atoms (i.e., $C_2$-$C_6$ alkenyl), and having one or more (e.g., 2, 3, etc.) carbon-carbon double bonds. The alkenyl group may be linear, branched or cyclic. Examples of alkenyls include, but are not limited to ethenyl (vinyl), 2-propenyl, 3-propenyl, 1,4-pentadienyl, 1,4-butadienyl, 1-butenyl, 2-butenyl and 3-butenyl. "Alkenyl" is intended to embrace all structural isomeric forms of an alkenyl. For example, butenyl encompasses 1,4-butadienyl, 1-butenyl, 2-butenyl and 3-butenyl, etc.

As used herein, and unless otherwise specified, the term "alkenylene" refers to a divalent alkenyl moiety containing 2 to about 12 carbon atoms (i.e., $C_2$-$C_{12}$ alkenylene) in length and meaning that the alkylene moiety is attached to the rest of the molecule at both ends of the alkyl unit. For example, alkenylenes include, but are not limited to, —CH=CH—, —CH=CHCH$_2$—, —CH=CH=CH—, —CH$_2$CH$_2$CH=CHCH$_2$-, etc. The alkenylene group may be linear or branched.

As used herein, and unless otherwise specified, the term "alkynyl" refers to an unsaturated hydrocarbon radical having from 2 to 12 carbon atoms (i.e., $C_2$-$C_{12}$ alkynyl), particularly from 2 to 8 carbon atoms (i.e., $C_2$-$C_8$ alkynyl), particularly from 2 to 6 carbon atoms (i.e., $C_2$-$C_6$ alkynyl), and having one or more (e.g., 2, 3, etc.) carbon-carbon triple bonds. The alkynyl group may be linear, branched or cyclic. Examples of alkynyls include, but are not limited to ethynyl, 1-propynyl, 2-butynyl, and 1,3-butadiynyl. "Alkynyl" is intended to embrace all structural isomeric forms of an alkynyl. For example, butynyl encompasses 2-butynyl, and 1,3-butadiynyl and propynyl encompasses 1-propynyl and 2-propynyl (propargyl).

As used herein, and unless otherwise specified, the term "alkynylene" refers to a divalent alkynyl moiety containing 2 to about 12 carbon atoms (i.e., $C_2$-$C_{12}$ alkenylene) in length and meaning that the alkylene moiety is attached to the rest of the molecule at both ends of the alkyl unit. For example, alkenylenes include, but are not limited to, —CH$_2$CH$_2$CCCH$_2$-. The alkynylene group may be linear or branched.

As used herein, and unless otherwise specified, the term "alkoxy" refers to —O-alkyl containing from 1 to about 10 carbon atoms. The alkoxy may be straight-chain or branched-chain. Non-limiting examples include methoxy, ethoxy, propoxy, butoxy, isobutoxy, tert-butoxy, pentoxy, and hexoxy. "$C_1$ alkoxy" refers to methoxy, "$C_2$ alkoxy" refers to ethoxy, "$C_3$ alkoxy" refers to propoxy and "$C_4$ alkoxy" refers to butoxy. Further, as used herein, "OMe" refers to methoxy and "OEt" refers to ethoxy.

As used herein, and unless otherwise specified, the term "aromatic" refers to unsaturated cyclic hydrocarbons having a delocalized conjugated 7E system and having from 5 to 20 carbon atoms (aromatic $C_5$-$C_{20}$ hydrocarbon), particularly from 5 to 12 carbon atoms (aromatic $C_5$-$C_{12}$ hydrocarbon), and particularly from 5 to 10 carbon atoms (aromatic $C_5$-$C_{12}$ hydrocarbon). Exemplary aromatics include, but are not limited to benzene, toluene, xylenes, mesitylene, ethylbenzenes, cumene, naphthalene, methylnaphthalene, dimethylnaphthalenes, ethylnaphthalenes, acenaphthalene, anthracene, phenanthrene, tetraphene, naphthacene, benzanthracenes, fluoranthrene, pyrene, chrysene, triphenylene, and the like, and combinations thereof.

Unless otherwise indicated, where isomers of a named alkyl, alkenyl, alkoxy, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

As used herein, the term "hydroxyl" refers to an —OH group.

As used herein, "oxygenate" refers to a saturated, unsaturated, or polycyclic cyclized hydrocarbon radical containing from 1 to 40 carbon atoms and further containing one or more oxygen heteroatoms.

As used herein, "aluminum alkyl adducts" refers to the reaction product of aluminum alkyls and/or alumoxanes with quenching agents, such as water and/or methanol.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

A "polymer" has two or more of the same or different mer units. A "homopolymer" is a polymer having mer units that are the same. A "copolymer" is a polymer having two or more mer units that are distinct or different from each other. A "terpolymer" is a polymer having three mer units that are distinct or different from each other. "Distinct" or "different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

"Polymerizable conditions" refer those conditions including a skilled artisan's selection of temperature, pressure, reactant concentrations, optional solvent/diluents, reactant mixing/addition parameters, and other conditions within at least one polymerization reactor that are conducive to the reaction of one or more olefin monomers when contacted with an activated olefin polymerization catalyst to produce the desired polyolefin polymer through typically coordination polymerization.

The term "continuous" means a system that operates without interruption or cessation. For example a continuous process to produce a polymer would be one where the reactants are continually introduced into one or more reactors and polymer product is continually withdrawn.

A "solution polymerization" means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, Ind. Eng. Chem. Res. 29, 2000, 4627.

A "bulk polymerization" means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, preferably less than 10 wt %, preferably less than 1 wt %, preferably 0 wt %.

A "catalyst composition" or "catalyst system" is the combination of at least one catalyst compound, a support material, an optional activator, and an optional co-activator. For the purposes of this invention and the claims thereto, when catalyst systems or compositions are described as comprising neutral stable forms of the components, it is well understood by one of ordinary skill in the art, that the ionic form of the component is the form that reacts with the monomers to produce polymers. When it is used to describe such after activation, it means the support, the activated complex, and the activator or other charge-balancing moiety.

The transition metal compound may be neutral as in a precatalyst, or a charged species with a counter ion as in an activated catalyst system.

Coordination polymerization is an addition polymerization in which successive monomers are added to or at an organometallic active center to create and/or grow a polymer chain.

The terms "cocatalyst" and "activator" are used herein interchangeably and are defined to be any compound which can activate any one of the catalyst compounds herein by converting the neutral catalyst compound to a catalytically active catalyst compound cation.

"BOCD" refers to a Broad Orthogonal Composition Distribution in which the comonomer of a copolymer is incorporated predominantly in the high molecular weight chains or species of a polyolefin polymer or composition. The distribution of the short chain branches can be measured, for example, using Temperature Raising Elution Fractionation (TREF) in connection with a Light Scattering (LS) detector to determine the weight average molecular weight of the molecules eluted from the TREF column at a given temperature. The combination of TREF and LS (TREF-LS) yields information about the breadth of the composition distribution and whether the comonomer content increases, decreases, or is uniform across the chains of different molecular weights of polymer chains. BOCD has been described, for example, in U.S. Pat. Nos. 8,378,043, Col. 3, line 34, bridging Col. 4, line 19, and 8,476,392, line 43, bridging Col. 16, line 54.

The TREF-LS data reported herein were measured using an analytical size TREF instrument (Polymerchar, Spain), with a column of the following dimension: inner diameter (ID) 7.8 mm and outer diameter (OD) 9.53 mm and a column length of 150 mm. The column was filled with steel beads. 0.5 mL of a 6.4% (w/v) polymer solution in orthodichlorobenzene (ODCB) containing 6 g BHT/4 L were charged onto the column and cooled from 140° C. to 25° C. at a constant cooling rate of 1.0° C./min. Subsequently, the ODCB was pumped through the column at a flow rate of 1.0 ml/min and the column temperature was increased at a constant heating rate of 2° C./min to elute the polymer. The polymer concentration in the eluted liquid was detected by means of measuring the absorption at a wavenumber of 2857 $cm^{-1}$ using an infrared detector. The concentration of the ethylene-α-olefin copolymer in the eluted liquid was calculated from the absorption and plotted as a function of temperature. The molecular weight of the ethylene-α-olefin copolymer in the eluted liquid was measured by light scattering using a Minidawn Tristar light scattering detector (Wyatt, Calif., USA). The molecular weight was also plotted as a function of temperature.

The breadth of the composition distribution is characterized by the $T_{75}$-$T_{25}$ value, wherein $T_{25}$ is the temperature at which 25% of the eluted polymer is obtained and $T_{75}$ is the temperature at which 75% of the eluted polymer is obtained in a TREF experiment as described herein. The composition distribution is further characterized by the $F_{80}$ value, which is the fraction of polymer that elutes below 80° C. in a TREF-LS experiment as described herein. A higher $F_{80}$ value indicates a higher fraction of comonomer in the polymer molecule. An orthogonal composition distribution is defined by a $M_{60}/M_{90}$ value that is greater than 1, wherein $M_{60}$ is the molecular weight of the polymer fraction that elutes at 60° C. in a TREF-LS experiment and $M_{90}$ is the molecular weight of the polymer fraction that elutes at 90° C. in a TREF-LS experiment as described herein.

In a class of embodiments, the polymers as described herein may have a BOCD characterized in that the $T_{75}$-$T_{25}$ value is 1 or greater, 2.0 or greater, 2.5 or greater, 4.0 or greater, 5.0 or greater, 7.0 or greater, 10.0 or greater, 11.5 or greater, 15.0 or greater, 17.5 or greater, 20.0 or greater, or 25.0 or greater, wherein $T_{25}$ is the temperature at which 25% of the eluted polymer is obtained and $T_{75}$ is the temperature at which 75% of the eluted polymer is obtained in a TREF experiment as described herein.

The polymers as described herein may further have a BOCD characterized in that $M_{60}/M_{90}$ value is 1.5 or greater, 2.0 or greater, 2.25 or greater, 2.50 or greater, 3.0 or greater, 3.5 or greater, 4.0 or greater, 4.5 or greater, or 5.0 or greater, wherein $M_{60}$ is the molecular weight of the polymer fraction that elutes at 60° C. in a TREF-LS experiment and $M_{90}$ is the molecular weight of the polymer fraction that elutes at 90° C. in a TREF-LS experiment as described herein.

Additionally, the polymers as described herein may further have a BOCD characterized in that $F_{80}$ value is 1% or greater, 2% or greater, 3% or greater, 4% or greater, 5% or greater, 6% or greater, 7% or greater, 10% or greater, 11% or greater, 12% or greater, or 15% or greater, wherein $F_{80}$ is the fraction of polymer that elutes below 80° C.

Olefin Polymerization Catalysts
Metallocene Catalysts

Useful olefin polymerization catalysts include metallocene catalyst compounds represented by the formula (VII):

$$T_y Cp_m M^6 G_n X^5_q \qquad (VII),$$

wherein each Cp is, independently, a cyclopentadienyl group (such as cyclopentadiene, indene or fluorene) which may be substituted or unsubstituted, $M^6$ is a Group 4 transition metal, for example, titanium, zirconium, hafnium, G is a heteroatom group represented by the formula $JR^*_z$ where J is N, P, O or S, and $R^*$ is a $C_1$ to $C_{20}$ hydrocarbyl group and z is 1 or 2, T is a bridging group, and y is 0 or 1, $X^5$ is a leaving group (such as a halide, a hydride, an alkyl group, an alkenyl group or an arylalkyl group), and m=1 or 2, n=0, 1, 2 or 3, q=0, 1, 2 or 3, and the sum of m+n+q is equal to the oxidation state of the transition metal. See, for example, WO 2016/094843.

In an embodiment, each Cp is a cyclopentadiene, indene or fluorene, which may be substituted or unsubstituted, and each $M^6$ is titanium, zirconium, or hafnium, and each $X^5$ is, independently, a halide, a hydride, an alkyl group, an alkenyl group or an arylalkyl group. In any of the embodiments described herein, y may be 1, m may be one, n may be 1, J may be N, and $R^*$ may be methyl, ethyl, propyl, butyl, pentyl, hexyl, heptyl, octyl, nonyl, cyclooctyl, cyclododecyl, decyl, undecyl, dodecyl, adamantyl or an isomer thereof.

In another embodiment, the one or more olefin polymerization catalysts may comprise one or more metallocene catalysts of: dimethylsilyl (tetramethylcyclopentadienyl)(cyclododecylamido)titanium dimethyl; dimethylsilyl (tetramethylcyclopentadienyl)(cyclododecylamido)titanium dichloride; dimethylsilyl (tetramethylcyclopentadienyl)(t-butylamido)titanium dimethyl; dimethylsilyl (tetramethylcyclopentadienyl)(t-butylamido)titanium dichloride; $(CH_3)_2$Si(cyclopentadienyl)(1-adamantylamido)$M^7(R^{15})_2$; µ-$(CH_3)_2$Si(3-tertbutylcyclopentadienyl)(1-adamantylamido)$M^7(R^{15})_2$; µ-$(CH_3)_2$(tetramethylcyclopentadienyl)(1-adamantylamido)$M^7(R^{15})_2$; µ-$(CH_3)_2$Si(tetramethylcyclopentadienyl)(1-adamantylamido)$M^7(R^{15})_2$; µ-$(CH_3)_2$C(tetramethylcyclopentadienyl)(1-adamantylamido)$M^7(R^{15})_2$; µ-$(CH_3)_2$Si(tetramethylcyclopentadienyl)(1-tert-butylamido)$M^7(R^{15})_2$; µ-$(CH_3)_2$Si(fluorenyl)(1-tertbutylamido)$M^7(R^{15})_2$; µ-$(CH_3)_2$Si(tetramethylcyclopentadienyl) (1-cyclododecylamido)$M^7(R^{15})_2$; or µ-$(C_6H_5)_2$C(tetramethylcyclopentadienyl)(1-cyclododecylamido)$M^7(R^{15})_2$, where $M^7$ is selected from a group consisting of Ti, Zr, and Hf and $R^{15}$ is selected from halogen or $C_1$-$C_5$ alkyl.

In yet another embodiment, the one or more olefin polymerization catalysts may comprise one or more metallocene catalysts of: bis(tetrahydroindenyl)Hf Me$_2$; bis(1-butyl,3-methylcyclopentadienyl)ZrCl$_2$; bis-(n-butylcyclopentadienyl)ZrCl$_2$; (dimethylsilyl)$_2$O bis(indenyl)ZrCl$_2$; dimethylsilyl(3-(3-methylbutyl)cyclopentadienyl)(2,3,4,5-tetramethylcyclopentadienyl)ZrCl$_2$; dimethylsilylbis(tetrahydroindenyl)ZrCl$_2$; dimethylsilyl(3-phenyl- indenyl)(tetramethylcyclopentadienyl)ZrCl$_2$; dimethylsilyl(3-neopentylcyclopentadienyl)(tetramethylcyclopentadienyl) HfCl$_2$; tetramethyldisilylene bis(4-(3,5-di-tert-butylphenyl)-indenyl)ZrCl$_2$; cyclopentadienyl(1,3-diphenylcyclopentadienyl)ZrCl$_2$; bis(cyclopentadienyl) zirconium dichloride; bis(pentamethylcyclopentadienyl) zirconium dichloride; bis(pentamethycyclopentadienyl) zirconium dimethyl; is(pentamethylcyclopentadienyl) hafnium dichloride; bis(pentamethylcyclopentadienyl) zirconium dimethyl; bis(1-methyl-3-n-butylcyclopentadienyl)zirconium dichloride; bis(1 -methyl-3-n-butylcyclopentadienyl)zirconium dimethyl; bis(1-methyl -3-n- butylcyclopentadienyl)hafnium dichloride; bis (1-methyl-3-n-butylcyclopentadienyl)zirconium dimethyl; bis(indenyl)zirconium dichloride; bis(indenyl)zirconium dimethyl; bis(tetrahydro-1-indenyl)zirconium dichloride; bis(tetrahydro-1-indenyl)zirconium dimethyl; dimethylsilylbis(tetrahythoindenyl)zirconium dichloride; dimethylsilylbis(tetrahydroindenyl)zirconium dimethyl; dimethylsiylbis(indenyl)zirconium dichloride; dimethylsilyl(bisindenyl) zirconium dimethyl; dimethylsilylbis(cyclopentadienyl) zirconium dichloride; or dimethylsilylbis(cyclopentadienyl) zirconium dimethyl.

In another embodiment, the one or more olefin polymerization catalyst compounds may comprise a first metallocene catalyst and a second metallocene catalyst independently selected from the group consisting of: SiMe2(Me4Cp)(cCi2N)TiMe2 and bis(1-Bu,3-Me-Cp) ZrCl$_2$; SiMe$_2$(Me$_4$Cp)(cC$_{12}$N)TiMe$_2$ and (SiMe$_2$) bis(indenyl)ZrCl$_2$; SiMe$_2$(Me$_4$Cp)(cC$_{12}$N)TiMe$_2$ and (SiMe$_2$)$_2$O bis(indenyl) ZrCl$_2$; SiMe$_2$(Me$_4$Cp)(cC$_{12}$N)TiMe$_2$ and (SiMe$_2$)$_2$O bis(indenyl)ZrMe$_2$; SiMe$_2$(Me$_4$Cp)(cC$_{12}$N)TiMe$_2$ and SiMe$_2$(3-neopentylCp)((Me$_4$Cp)HfCl$_2$; SiMe$_2$(Me$_4$Cp)(cC$_{12}$N) TiMe$_2$ and SiMe$_2$(3-neopentylcyclopentadienyl)(Me$_4$Cp) HfMe$_2$; SiMe$_2$(Me$_4$Cp)(1-adamantylamido)TiMe$_2$ and bis (1-Bu,3-MeCp)ZrC$_{12}$; and SiMe$_2$(Me$_4$Cp)(1-t-butylamido) TiMe$_2$ and bis(1-Bu,3-MeCp)ZrCl$_2$.

In a class of embodiments, the one or more metallocene catalysts may comprise (4-propyl, 1,2-dimethylcyclopentadienyl)(cyclopentadienyl)hafnium dichloride; (tetramethylcyclopentadienyl)(propylcyclopentadienyl)hafnium dimethyl; (tetramethylcyclopentadienyl)(propylcyclopentadienyl)zirconium dimethyl; (3,4-dipropyl, 1,2-dimethylcyclopentadienyl)(cyclopentadienyl)hafnium dimethyl; (propylcyclopentadienyl)(methylcyclopentadienyl)hafnium dimethyl; (propylcyclopentadienyl)(cyclopentadienyl)hafnium dimethyl; (tetramethylcyclopentadienyl)(benzylcyclopentadienyl)zirconium dimethyl; silacyclopentyl(tetramethylcyclopentadienyl)(cyclopentadienyl)zirconium dichloride; dimethylsilyl (tetramethylcyclopentadienyl)(3-(1-hexenyl)cyclopentadienyl)zirconium dichloride; or dimethylsilyl(tetramethylcyclopentadienyl)(3-trimethylsilylmethylcyclopentadienyl)hafnium dimethyl.

Catalyst Compounds Comprising Nitrogen Linkages

Useful olefin polymerization catalysts also include:

(A) a compound represented by the Formula (VIII):

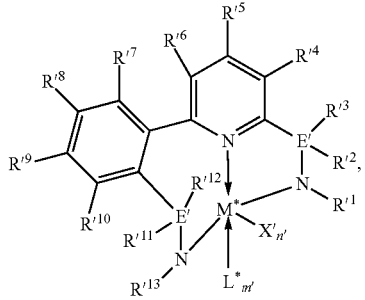

(VIII)

wherein:
M* is a Group 4 metal;
each E' group is independently selected from carbon, silicon, or germanium;
each X' is an anionic leaving group;
L* is a neutral Lewis base;
$R'^1$ and $R'^{13}$ are independently selected from the group consisting of hydrocarbyls, substituted hydrocarbyls, and silyl groups;
$R'^2$, $R'^3$, $R'^4$, $R'^5$, $R'^6$, $R'^7$, $R'^8$, $R'^9$, $R'^{10}$, $R'^{11}$, and $R'^{12}$ are independently selected from the group consisting of hydrogen, hydrocarbyls, alkoxy, silyl, amino, aryloxy, substituted hydrocarbyls, halogen, and phosphino;
n' is 1 or 2;
m' is 0, 1, or 2; and
two X' groups may be joined together to form a dianionic group;
two L* groups may be joined together to form a bidentate Lewis base;
an X' group may be joined to an L* group to form a monoanionic bidentate group;
$R'^7$ and $R'^8$ may be joined to form a ring; and
$R'^{10}$ and $R'^{11}$ may be joined to form a ring);

(B) a compound represented by the Formula (IX):

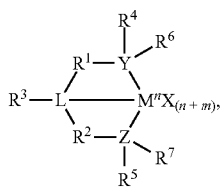

(IX)

wherein:
M is a Group 3-12 transition metal or a Group 13 or 14 main group metal;
each X is independently an anionic leaving group;
n is the formal oxidation state of M;
m is the formal charge of the ligand comprising Y, Z, and L;
Y is a Group 15 element;
Z is a Group 15 element;
$R^1$ and $R^2$ are independently a $C_1$ to $C_{20}$ hydrocarbon group, a heteroatom-containing group having up to twenty carbon atoms, silicon, germanium, tin, lead, phosphorus, or a halogen, where $R^1$ and $R^2$ may also be interconnected to each other;
$R^3$ is absent or a hydrocarbon group, hydrogen, a halogen, or a heteroatom-containing group;
$R^4$ and $R^5$ are independently an aryl group, a substituted aryl group, a cyclic alkyl group, a substituted cyclic alkyl group, a cyclic aralkyl group, a substituted cyclic aralkyl group or multiple ring system; and
$R^6$ and $R^7$ are independently absent, or hydrogen, halogen, heteroatom or a hydrocarbyl group; or (C) a compound represented by the Formula (X).

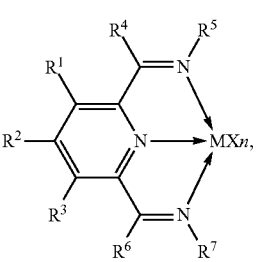

(X)

wherein:
M comprises a transition metal from Group 7, 8 or 9 of the Periodic Table of Elements;
X is an atom or group covalently or ionically bonded to the transition metal M;
n is 1, 2, 3, 4, or 5; and
$R^1$ to $R^7$ are independently selected from the group consisting of hydrogen, halogens, hydrocarbyls, and substituted hydrocarbyls, provided that when any two or more of $R^1$ to $R^7$ are hydrocarbyl or substituted hydrocarbyl, two or more can be linked to form one or more cyclic substituents; and combinations thereof. See, for example, WO 2016/094870.

In an embodiment, one or more olefin polymerization catalyst compounds comprise a catalyst compound of the Formula (VIII), wherein M* is hafnium, each E' group is carbon, each X' is an alkyl, aryl, hydride, alkylsilane, fluoride, chloride, bromide, iodide, triflate, carboxylate, or alkylsulfonate, each L* is a an ether, amine, or thioether, each $R^1$ and $R^{13}$ is an aryl group, each $R^7$ and $R^8$ is joined to form a six-membered aromatic ring with the joined $R^7$ and $R^8$ group being —CH═CHCH═CH-, and $R^{10}$ and $R^{11}$ may be a five-membered ring with the joined $R'^{10}R'^{11}$ group being —CH$_2$CH$_2$- or a six-membered ring with the joined $R^{10}R^{11}$ group being —CH$_2$CH$_2$CH$_2$-).

In another embodiment, the one or more olefin polymerization catalyst compounds comprise a catalyst compound of the Formula (IX), wherein M is zirconium or hafnium, n is +3, +4, or +5, m is 0, −1, −2 or −3, L is nitrogen; Y is nitrogen or phosphorus, Z is nitrogen or phosphorus, $R^1$ and $R^2$ are a $C_2$ to $C_{20}$ alkyl, aryl or aralkyl group, $R^3$ is absent, a linear, cyclic or branched alkyl $C_1$ to $C_{20}$ group, or hydrogen, $R^4$ and $R^5$ independently are a $C_1$ to $C_{20}$ hydrocarbon group, a $C_1$ to $C_{20}$ aryl group or a $C_1$ to $C_{20}$ aralkyl group, and $R^6$ and $R^7$ are independently a linear, cyclic or branched $C_2$ to $C_{20}$ alkyl group or absent.

In yet another embodiment, the one or more olefin polymerization catalyst compounds comprise a catalyst compound of the Formula (X) and n is 2 or 3.

Phenoxide Transition Metal Compounds

Useful olefin polymerization catalysts also include:

(A) a compound represented by the Formula (XI):

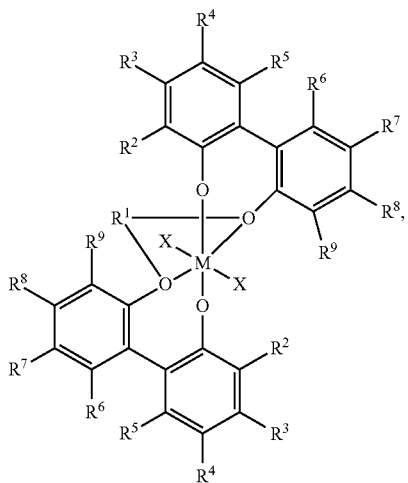

(XI)

wherein:

M is selected from the group consisting of Ti, Zr, and Hf;

each $R^1$ through $R^9$ may be independently selected from the group consisting of hydride, hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, aralkylene, alkaryl, alkarylene, halide, haloalkyl, haloalkenyl, haloalkynyl, heteroalkyl, heterocycle, heteroaryl, heteroatom-containing group, silyl, boryl, phosphino, phosphine, amino, and amine; and X is at least one leaving group. See, for example, WO 2016/094861.

Catalyst Compounds Comprising at least one Nitrogen Linkage and at least one Oxygen Linkage to a Transition Metal Additionally, useful olefin polymerization catalysts include:

(A) a compound represented by the Formula (XII):

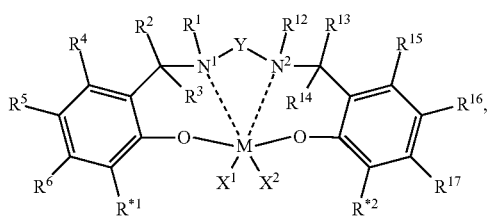

(XII)

wherein: each solid line represents a covalent bond and each dashed line represents a coordinative link; wherein M is a Group 3, 4, 5, or 6 transition metal; $N^1$ and $N^2$ are nitrogen; O is oxygen; each of $X^1$ and $X^2$ is, independently, a univalent $C_1$ to $C_{20}$ hydrocarbyl radical, a functional group comprising elements from Groups 13 to 17, or $X^1$ and $X^2$ join together to form a $C_4$ to $C_{62}$ cyclic or polycyclic ring structure, provided however when M is trivalent $X^2$ is not present; each $R^1$, $R^2$, $R^3$, $R^4$, $R^5$, $R^6$, $R^{12}$, $R^{13}$, $R^{14}$, $R^{15}$, $R^{16}$, and $R^{17}$ is, independently, hydrogen, a $C_1$ to $C_{40}$ hydrocarbyl radical, a $C_1$ to $C_{40}$ substituted hydrocarbyl radical, two or more of $R^1$, $R^2$, $R^3$, $R^4$, $R^5$, $R^6$, $R^{12}$, $R^{13}$, $R^{14}$, $R^{15}$, $R^{16}$, and $R^{17}$ independently join together to form a $C_4$ to $C_{62}$ cyclic or polycyclic ring structure, or a combination thereof; wherein $R^{*1}$ and $R^{*2}$ independently comprise a bulky functional group, an electron withdrawing group, or a combination thereof; and Y is a divalent $C_1$ to $C_{20}$ hydrocarbyl radical;

(B) a compound represented by the Formula (XIII):

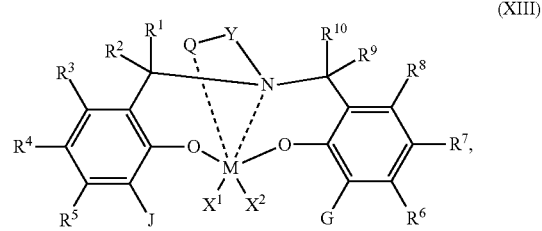

(XIII)

wherein:

M is a Group 4 transition metal; $X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure; each $R^1$, $R^2$, $R^3$, $R^4$, $R^5$, $R^6$, $R^7$, $R^8$, $R^9$, and $R^{10}$ is independently a hydrogen, a $C_1$ to $C_{40}$ hydrocarbyl radical, a $C_1$ to $C_{40}$ substituted hydrocarbyl radical, a heteroatom or a heteroatom-containing group, or two or more of $R^1$ to $R^{10}$ may independently join together to form a $C_4$ to $C_{62}$ cyclic or polycyclic ring structure, or a combination thereof; and Q is a neutral donor group;

J is a $C_7$ to $C_{60}$ fused polycyclic group, which optionally comprises up to 20 atoms from Groups 15 and 16, where at least one ring is aromatic and where at least one ring, which may or may not be aromatic, has at least five members; G is as defined for J or may be hydrogen, a $C_1$ to $C_{60}$ hydrocarbyl radical, a $C_1$ to $C_{60}$ substituted hydrocarbyl radical, a heteroatom or a heteroatom-containing group, or may independently form a $C_4$ to $C_{60}$ cyclic or polycyclic ring structure with $R^6$, $R^7$, or $R^8$ or a combination thereof; or (C) a compound represented by the Formula (XIV).

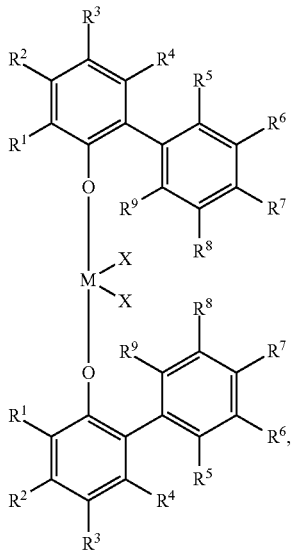

(XIV)

wherein:
M is selected from the group consisting of Ti, Zr, and Hf;
at least one of $R^1$ through $R^9$ is substituted with a moiety having the following structure (XV):

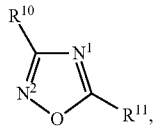

(XV)

where structure (XV) is attached at any one of $R^1$ through $R^9$ at the $R^{10}$ or $R^{11}$ position; at least one of nitrogen $N^1$ or $N^2$ of Structure (XV) forms a dative bond with metal M; and each of $R^1$ through $R^{11}$ are independently selected from the group consisting of hydride, hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, aralkylene, alkaryl, alkarylene, halide, haloalkyl, haloalkenyl, haloalkynyl, heteroalkyl, heterocycle, heteroaryl, heteroatom-containing group, silyl, boryl, phosphino, phosphine, amino, and amine; X is a leaving group; and combinations thereof.

In an embodiment, the one or more olefin polymerization catalyst compounds comprise a catalyst compound of the Formula (XII), wherein $X^1$ and $X^2$ are benzyl radicals and Y is selected from the group consisting of —CH$_2$CH$_2$-, 1,2-cyclohexylene, and —CH$_2$CH$_2$CH$_2$-.

In another embodiment, the one or more olefin polymerization catalyst compounds comprise a catalyst compound of Formula (XII), wherein $R^{*1}$ and $R^{*2}$ each comprises a cyclopentadienyl radical having a structure according to the Formula:

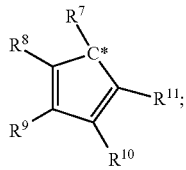

(XVI)

wherein:
C* indicates an attachment carbon of the radical;
$R^7$ is a $C_1$ to $C_{40}$ hydrocarbyl radical or a substituted $C_1$ to $C_{40}$ hydrocarbyl radical; and each of $R^8$, $R^9$, $R^{10}$, and $R^{11}$ is, independently, a hydrogen, a $C_1$ to $C_{40}$ hydrocarbyl radical, a substituted $C_1$ to $C_{40}$ hydrocarbyl radical, two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, and $R^{17}$ from Formula (XII) independently join together to form a $C_4$ to $C_{62}$ cyclic or polycyclic ring structure, or a combination thereof.

In yet another embodiment, the one or more olefin polymerization catalyst compounds comprise a catalyst compound of Formula (XIII), wherein the complex is represented by the Formulas (XVII) or (XIII):

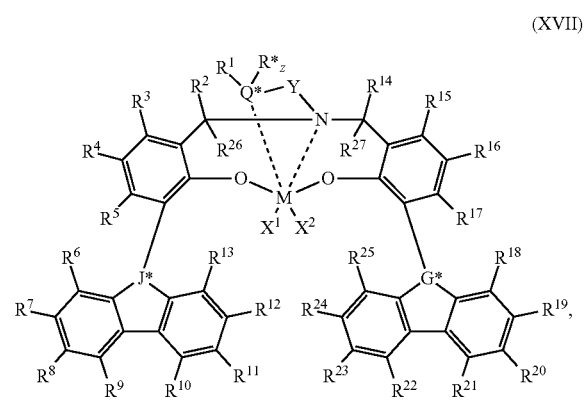

(XVII)

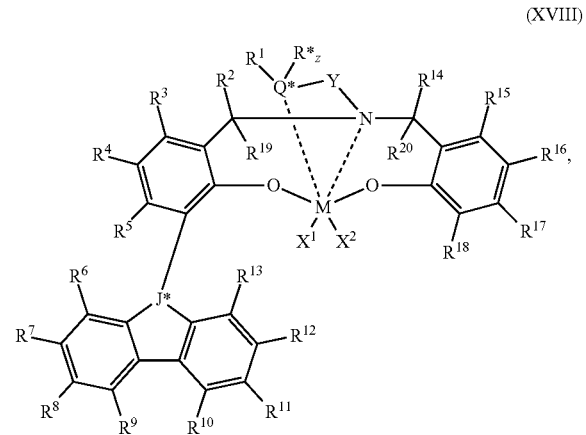

(XVIII)

wherein:

M is Hf, Zr, or Ti; $X^1$, $X^2$, $R^1$, $R^2$, $R^3$, $R^4$, $R^5$, $R^6$, $R^7$, $R^8$, $R^9$, $R^{10}$, and Y are as defined in claim 1; each R*, R'', $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is, independently, a hydrogen, a $C_1$ to $C_{40}$ hydrocarbyl radical, a $C_1$ to $C_{40}$ substituted hydrocarbyl radical, a functional group comprising elements from Groups 13 to 17, or two or more of $R^1$ to $R^{28}$ may independently join together to form a $C_4$ to $C_{62}$ cyclic or polycyclic ring structure, or a combination thereof, or R1 and R* may independently join together to form a five- to eight-membered heterocycle; Q* is a group 15 or 16 atom; z is 0 or 1; J* is CR'' or N; and G* is CR'' or N.

In still another embodiment, the one or more olefin polymerization catalyst compounds comprise a catalyst compound of Formula (XIII), wherein the catalyst complex is represented by the Formulas (XIX) or (XX):

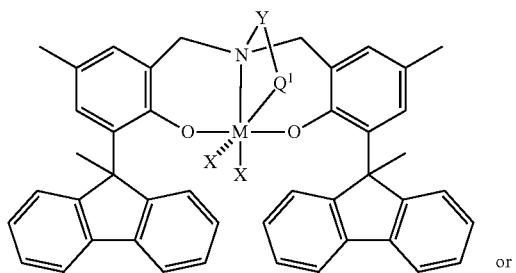

(XIX)

or

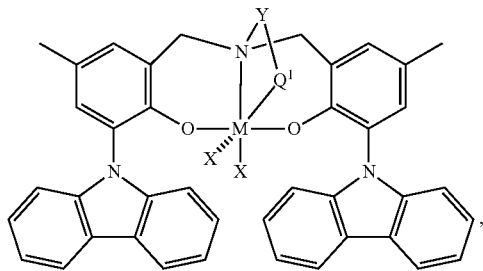

(XX)

where Y is a divalent $C_1$ to $C_3$ hydrocarbyl, $Q^1$ is NR'$_2$, OR', SR', PR'$_2$, where R' is as defined for $R^1$ in claim 1, M is Zr, Hf, or Ti and each X is, independently, as defined for $X^1$ in claim 1.

In an embodiment, the one or more olefin polymerization catalyst compounds comprise a catalyst compound of the Formula (XIV), wherein the catalyst complex is represented by the Formula (XXI):

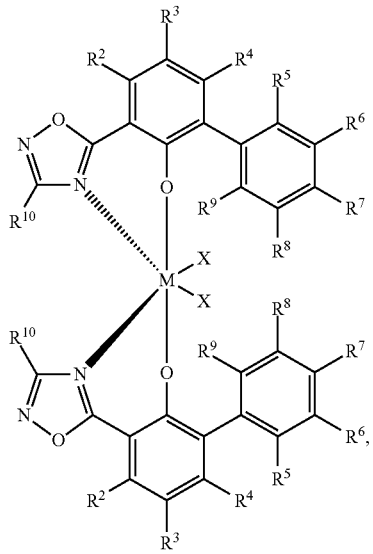

(XXI)

where M is selected from the group consisting of Ti, Zr, and Hf;

each of $R^2$ through $R^{10}$ are independently selected from the group consisting of hydride, hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, aralkylene, alkaryl, alkarylene, halide, haloalkyl, haloalkenyl, haloalkynyl, heteroalkyl, heterocycle, heteroaryl, heteroatom-containing group, silyl, boryl, phosphino, phosphine, amino, and amine; and X is at least one leaving group.

Activators

The catalyst compositions may be combined with activators in any manner in the art including by supporting them for use in slurry or gas phase polymerization. Activators are generally compounds that can activate any one of the catalyst compounds described above by converting the neutral metal compound to a catalytically active metal compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal compound cationic and providing a charge-balancing non-coordinating or weakly coordinating anion.

Alumoxane Activators

Alumoxane activators are utilized as activators in the catalyst compositions described herein. Alumoxanes are generally oligomeric compounds containing —Al(R')—O— sub-units, where IV is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In class of embodiments, little or no alumoxane is used in the polymerization processes described herein. Preferably, alumoxane is present at zero mole %, alternatively, the alumoxane is present at a molar ratio of aluminum to catalyst compound transition metal less than 500:1, preferably less than 300:1, preferably less than 100:1, and preferably less than 1:1.

In another class of embodiments, the at least one activator comprises aluminum and the aluminum to transition metal, for example, hafnium or zirconium, ratio is at least 150 to 1; the at least one activator comprises aluminum and the aluminum to transition metal, for example, hafnium or zirconium, ratio is at least 250 to 1; or the at least one activator comprises aluminum and the aluminum to transition metal, for example, hafnium or zirconium, ratio is at least 1,000 to 1.

Ionizing/Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization. Ionizing activators useful herein typically comprise an NCA, particularly a compatible NCA.

It is within the scope of this invention to use an ionizing activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

For descriptions of useful activators please see U.S. Pat. Nos. 8,658,556 and 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis (trifluoromethyl)phenyl)borate, triphenylcarbenium tetrakis(perfluorophenyl)borate, [Me$_3$NH$^+$][B(C$_6$F$_5$)$_4^-$]; 1-(4-(tris(pentafluorophenyl)borate)-2,3,5,6-tetrafluorophenyl)pyrrolidinium; and tetrakis (pentafluorophenyl)borate, 4-(tris (pentafluorophenyl) borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, triphenylcarbenium tetrakis (3,5-bis (trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2, 3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis(perfluorobiphenyl)borate, N,N-dialkylanilinium tetrakis(perfluorobiphenyl)borate, trialkylammonium tetrakis (3,5-bis (trifluoromethyl)phenyl)borate, N,N-dialkylanilinium tetrakis (3,5-bis (trifluoromethyl)phenyl)borate, N,N-dialkyl-(2, 4,6-trimethylanilinium) tetrakis (3,5-bis (trifluoromethyl) phenyl)borate, di-(i-propyl)ammonium tetrakis (pentafluorophenyl)borate, (where alkyl is methyl, ethyl, propyl, n-butyl, sec-butyl, or t-butyl).

The typical activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

Support Materials

The catalyst composition may optionally comprise at least one "support" or sometimes also referred to as a "carrier". The terms may be interchangeable unless otherwise distinguished. Suitable supports, include but are not limited to silica, alumina, silica-alumina, zirconia, titania, silica-alumina, cerium oxide, magnesium oxide, or combinations thereof. The catalyst may optionally comprise a support or be disposed on at least one support. Suitable supports, include but are not limited to, active and inactive materials, synthetic or naturally occurring zeolites, as well as inorganic materials such as clays and/or oxides such as silica, alumina, zirconia, titania, silica-alumina, cerium oxide, magnesium oxide, or combinations thereof. In particular, the support may be silica-alumina, alumina and/or a zeolite, particularly alumina. Silica-alumina may be either naturally occurring or in the form of gelatinous precipitates or gels including mixtures of silica and metal oxides.

In class of embodiments, the at least one support may comprise an organosilica material. The organosilica material supports may be a polymer formed of at least one monomer. In certain embodiments, the organosilica material may be a polymer formed of multiple distinct monomers. Methods and materials for producing the organosilica materials as well as characterization description may be found in, for example, WO 2016/094770 and WO 2016/094774.

Scavengers, Chain Transfer Agents and/or Co-Activators

Scavengers, chain transfer agents, or co-activators may also be used. Aluminum alkyl compounds which may be utilized as scavengers or co-activators include, for example, one or more of those represented by the formula $AlR_3$, where each R is, independently, a $C_1$-$C_8$ aliphatic radical, preferably methyl, ethyl, propyl, butyl, pentyl, hexyl octyl or an isomer thereof), especially trimethylaluminum, triethylaluminum, triisobutylaluminum, tri-n-hexylaluminum, tri-n-octylaluminum or mixtures thereof Useful chain transfer agents that may also be used herein are typically a compound represented by the formula $AlR^{20}{}_3$, $ZnR^{20}{}_2$ (where each $R^{20}$ is, independently, a $C_1$-$C_8$ aliphatic radical, preferably methyl, ethyl, propyl, butyl, pentyl, hexyl octyl or an isomer thereof) or a combination thereof, such as diethyl zinc, trimethylaluminum, triisobutylaluminum, trioctylaluminum, or a combination thereof.

Polymerization Processes

In embodiments herein, the invention relates to polymerization processes where monomer (such as propylene and or ethylene), and optionally comonomer, are contacted with a catalyst system comprising at least one activator, at least one support and at least one catalyst, such as a metallocene compound, as described above. The support, catalyst compound, and activator may be combined in any order, and are combined typically prior to contacting with the monomers.

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof In an embodiment of the invention, the monomer comprises propylene and an optional comonomers comprising one or more ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups.

In another embodiment of the invention, the monomer comprises ethylene and optional comonomers comprising one or more $C_3$ to $C_{40}$ olefins, preferably $C_4$ to $C_{40}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

In a preferred embodiment one or more dienes are present in the polymer produced herein at up to 10 wt %, preferably at 0.00001 to 1.0 wt %, preferably 0.002 to 0.5 wt %, even more preferably 0.003 to 0.2 wt %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

Diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes ($M_w$ less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

Polymerization processes according to the present disclosure can be carried out in any manner known in the art. Any suspension, slurry, or gas phase polymerization process known in the art can be used under polymerizable conditions. Such processes can be run in a batch, semi-batch, or continuous mode. Heterogeneous polymerization processes (such as gas phase and slurry phase processes) are useful. A heterogeneous process is defined to be a process where the catalyst system is not soluble in the reaction media. Alternatively, in other embodiments, the polymerization process is not homogeneous.

A homogeneous polymerization process is defined to be a process where preferably at least 90 wt % of the product is soluble in the reaction media. Alternatively, the polymerization process is not a bulk process is particularly preferred. In a class of embodiments, a bulk process is defined to be a process where monomer concentration in all feeds to the reactor is preferably 70 vol % or more. Alternatively, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

In a preferred embodiment, the feed concentration of the monomers and comonomers for the polymerization is 60 vol % solvent or less, preferably 40 vol % or less, or preferably 20 vol % or less, based on the total volume of the feed stream. Preferably the polymerization is run in a bulk process.

Preferred polymerizations can be run at any temperature and/or pressure suitable to obtain the desired ethylene polymers and as described above. Typical pressures include pressures in the range of from about 0.35 MPa to about 10 MPa, preferably from about 0.45 MPa to about 6 MPa, or preferably from about 0.5 MPa to about 4 MPa in some embodiments.

In some embodiments, hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa).

In a class of embodiments, the polymerization is performed in the gas phase, preferably, in a fluidized bed gas phase process. Generally, in a fluidized bed gas phase process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.

In another embodiment of the invention, the polymerization is performed in the slurry phase. A slurry polymerization process generally operates between 1 to about 50 atmosphere pressure range (15 psi to 735 psi, 103 kPa to 5068 kPa) or even greater and temperatures as described above. In a slurry polymerization, a suspension of solid, particulate polymer is formed in a liquid polymerization diluent medium to which monomer and comonomers, along with catalysts, are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used, the process is typically operated above the reaction diluent critical temperature and pressure. Often, a hexane or an isobutane medium is employed.

In an embodiment, a preferred polymerization technique useful in the invention is referred to as a particle form polymerization, or a slurry process where the temperature is kept below the temperature at which the polymer goes into solution. Such technique is known in the art, and described in for instance U.S. Pat. No. 3,248,179. A preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. In one embodiment 500 ppm or less of hydrogen is added, or 400 ppm or less or 300 ppm or less. In other embodiments at least 50 ppm of hydrogen is added, or 100 ppm or more, or 150 ppm or more.

Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In a preferred embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone.

Useful reactor types and/or processes for the production of polyolefin polymers include, but are not limited to, UNIPOL™ Gas Phase Reactors (available from Univation Technologies); INEOS™ Gas Phase Reactors and Processes; Continuous Flow Stirred-Tank (CSTR) reactors (solution and slurry); Plug Flow Tubular reactors (solution and slurry); Slurry: (e.g., Slurry Loop (single or double loops)) (available from Chevron Phillips Chemical Company) and (Series Reactors) (available from Mitsui Chemicals); BORSTAR™ Process and Reactors (slurry combined with gas phase); and Multi-Zone Circulating Reactors (MZCR) such as SPHERIZONE™ Reactors and Process available from Lyondell Basell.

In several classes of embodiments, the catalyst activity of the polymerization reaction is at least 4,250 g/g*cat or greater, at least 4,750 g/g*cat or greater, at least 5,000 g/g*cat or greater, at least 6,250 g/g*cat or greater, at least 8,500 g/g*cat or greater, at least 9,000 g/g*cat or greater, at least 9,500 g/g*cat or greater, or at least 9,700 g/g*cat or greater.

Polyolefin Products

In an embodiment, the process described herein produces homopolymers copolymers of one, two, three, four or more $C_2$ to $C_{40}$ olefin monomers, preferably $C_2$ to $C_{20}$ alpha olefin monomers. Particularly useful monomers include ethylene, propylene, butene, pentene, hexene, heptene, octene, nonene, decene, undecene, dodecene, isomers thereof and mixtures thereof.

Likewise, the process of this invention produces olefin polymers, preferably polyethylene and polypropylene homopolymers and copolymers. In a preferred embodiment, the polymers produced herein are homopolymers of ethylene or homopolymers of propylene.

Alternatively, the polymers produced herein are copolymers of a $C_2$ to $C_{40}$ olefin and one, two or three or more different $C_2$ to $C_{40}$ olefins, (where the $C_2$ to $C_{40}$ olefins are preferably $C_3$ to $C_{20}$ olefins, preferably are $C_3$ to $C_{12}$ alpha-olefin, preferably are propylene, butene, hexene, octene, decene, dodecene, preferably propylene, butene, hexene, octene, or a mixture thereof).

Alternatively, the polymers produced herein are copolymers of ethylene preferably having from 0 to 25 mole % (alternately from 0.5 to 20 mole %, alternately from 1 to 15 mole %, preferably from 3 to 10 mole %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene, or a mixture thereof).

This invention also relates to compositions of matter produced by the methods described herein.

In a preferred embodiment, the process described herein produces ethylene homopolymers or ethylene copolymers, such as ethylene-alphaolefin (preferably $C_3$ to $C_{20}$) copolymers (such as ethylene-butene copolymers, ethylene-hexene and/or ethylene-octene copolymers) having: a Mw/Mn of greater than 1 to 4 (preferably greater than 1 to 3). Likewise, the process of this invention produces ethylene copolymers. In a preferred embodiment, the copolymers produced herein have from 0 to 20 mole % (alternately from 0.1 to 15 mole %, alternately from 0.5 to 12 mole %, preferably from 1 to 10 mole %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene).

In a preferred embodiment, the monomer is ethylene and the comonomer is hexene, preferably from 0.2 to 25 mole % hexene, alternately 0.5 to 10 mole %.

In particular this invention relates to an in-situ ethylene polymer composition having: 1) at least 50 mol % ethylene; 2) a reversed comonomer index, mol %, (RCI,m) of 18 or more (preferably greater than 15, preferably greater than 13); and 3) a density of 0.90 g/cc or more, preferably 0.91 g/cc or more.

In any embodiment described herein the polymer produced by the processes described herein has RCI,m of 20 or more, alternately 40 or more, alternately 75 or more, alternately 100 or more, alternately 125 or more.

Typically, the polymers produced herein have an Mw of 5,000 to 1,000,000 g/mol (preferably 25,000 to 750,000 g/mol, preferably 50,000 to 500,000 g/mol), and/or an Mw/Mn of greater than 1 to 20 (alternately 1.2 to 15, alternately 1.4 to 10, alternately 1.5 to 7, alternately 1.6 to 5, alternately 1.8 to 3).

In a preferred embodiment, the polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versa).

Unless otherwise indicated Mw, Mn, MWD are determined by GPC as described the Experimental section below.

The reversed comonomer index (RCI,m or RCI,w) is a measure of comonomer distribution in relation to molecular weight and is calculated using data generated by Gel Permeation Chromatography as described in the Experimental section below.

Blends

In another embodiment, the polymer (preferably the polyethylene or polypropylene) produced herein is combined with one or more additional polymers prior to being formed into a film, molded part, or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

Films

Specifically, any of the foregoing polymers or blends thereof may be used in a variety of end-use applications. Such applications include, for example, mono- or multilayer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc., are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

Test Methods

$^1$H NMR

Unless otherwise indicated, 1H NMR data of non-polymeric compounds was collected at room temperature (~23° C.) in a 5 mm probe using a Bruker NMR spectrometer operating with a $^1$H frequency of 400 or 500 MHz. Data was recorded using a 30° flip angle RF pulse, 8 scans, with a delay of 5 seconds between pulses. Samples were prepared using approximately 5-10 mg of compound dissolved in approximately 1 mL of an appropriate deuterated solvent. Samples are referenced to residual proton of the solvents at 7.15, 7.24, 5.32, 5.98, and 2.10 for D5-benzene, chloroform, D-dichloromethane, D-1,1,2,2-tetrachloroethane, and $C_6D_5CD_2H$, respectively. Unless stated otherwise, NMR spectroscopic data of polymers was recorded in a 5 or 10 mm probe on the spectrometer at 120° C. using a d2-1,1,2,2-tetrachloroethane solution prepared from approximately 20 mg of polymer and 1 mL of solvent. Unless stated otherwise, data was recorded using a 30° flip angle RF pulse, 120 scans, with a delay of 5 seconds between pulses.

All reactions were performed in an inert $N_2$ purged glove box unless otherwise stated. All anhydrous solvents were purchased from Fisher Chemical and were degassed and dried over molecular sieves prior to use. Deuterated solvents were purchased from Cambridge Isotope Laboratories and dried over molecular sieves prior to use. n-Butyl lithium (2.5 M solution in hexane), methylmagnisium bromide (3.0 M solution in diethyl ether), dichloromethylsilane (Me(H)SiCl$_2$), and dichlorophenylsilane (Ph(H)SiCl$_2$) were purchased from Sigma-Aldrich, and hafnium tetrachloride (HfCl$_4$) 99+%, was purchased from Strem Chemicals and used as received. Lithium-n-propylcyclopentadienide was procured from Boulder Scientific. The $^1$H NMR measurements were recorded on a 400 MHz Bruker spectrometer.

Thermal Gravimetric Analysis (TGA)

Thermal stability results were recorded on Q5000 TGA. Ramp rate was 5° C./min, temperature range was from 25° C. to 800° C. All the samples were tested in both air and nitrogen.

Molecular Weight, Comonomer Composition, and Long Chain Branching Determination

Unless otherwise indicated, the distribution and the molecular weights (Mw, Mn, Mw/Mn, etc.), the comonomer content ($C_2$, $C_3$, $C_6$, etc.) and the branching index (g') are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. Given amount of polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 1 hour for PE samples. The TCB densities used in concentration calculation are 1.463 g/ml at about 23° C. and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=βI, where β is the mass constant determined with PE. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{a+1} + \frac{a_{PS}+1}{a+1} \log M_{PS},$$

where the variables with subscript "PS" stand for polystyrene while those without a subscript are for the test samples. In this method, $\alpha_{PS}$=0.67 and $K_{PS}$=0.000175 while a and K are for other materials as calculated and published in literature (Sun, T. et al. *Macromolecules* 2001, 34, 6812.), except that for purposes of this invention and the claims thereto, α and K are 0.695 and 0.000579, respectively, for ethylene polymers; α and K are 0.705 and 0.0002288, respectively, for propylene polymers; and α and K are 0.695 and 0.000579*(1-0.0075*wt % hexene comonomer), respectively, for ethylene-hexene copolymers.

The comonomer composition is determined by the ratio of the IR5 detector intensity corresponding to $CH_2$ and $CH_3$ channel calibrated with a series of PE homo/copolymer standards whose nominal value are predetermined by NMR.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the IR5 analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the equation $[\eta]=\eta_S/c$, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i[\eta]_i}{\sum c_i},$$

where the summations are over the chromatographic slices, i, between the integration limits.

The branching index $g'_{vis}$ is defined as $$g'_{vis} = \frac{[\eta]_{avg}}{KM_v^\alpha},$$

where $M_V$ is the viscosity-average molecular weight based on molecular weights determined by LS analysis and the K and α are for the reference linear polymer, which, for purposes of this invention and claims thereto, α=0.705 and K=0.000262 for linear propylene polymers, α=0.695 and K=0.000181 for linear butene polymers, α=0.695 and K=0.000579 for linear ethylene polymers, except that α is 0.695 and K is 0.000579*(1-0.0087*w2+0.000018*(w2)^2) for ethylene-butene copolymer where w2 is weight percent butene comonomer, α is 0.695 and K is 0.000579*(1-0.0075*w2) for ethylene-hexene copolymer where w2 is weight percent hexene comonomer, and α is 0.695 and K is 0.000579*(1-0.0077*w2) for ethylene-octene copolymer where w2 is weight percent octene comonomer. Concentrations are expressed in g/cm³, molecular weight is expressed in g/mole, and intrinsic viscosity (hence K in the Mark-Houwink equation) is expressed in dL/g unless otherwise noted. All molecular weights are weight average unless otherwise noted. All molecular weights are reported in g/mol unless otherwise noted.

The reversed-co-monomer index (RCI,m) is computed from x2 (mole % co-monomer C3, C4, C6, C8, etc.), as a function of molecular weight, where x2 is obtained from the following expression in which n is the number of carbon atoms in the comonomer (3 for C3, 4 for C4, 6 for C6, etc).

$$x2 = -\frac{200 w2}{-100n - 2w2 + nw2}$$

Then the molecular-weight distribution, W(z) where $z=\log_{10} M$, is modified to W'(z) by setting to 0 the points in W that are less than 5% of the maximum of W; this is to effectively remove points for which the S/N in the composition signal is low. Also, points of W' for molecular weights below 2000 gm/mole are set to 0. Then W' is renormalized so that $$1 = \int_{-\infty}^{\infty} W' dz$$

and a modified weight-average molecular weight ($M_w'$) is calculated over the effectively reduced range of molecular weight as follows:

$$M_w' = \int_{-\infty}^{\infty} 10^z * W' dz,$$

The RCI,m is then computed as $$\text{RCI},m = \int_{-\infty}^{\infty} x2\,(10^z - M_w') W' dz,$$

A reversed-co-monomer index (RCI,w) is also defined on the basis of the weight fraction co-monomer signal (w2/100) and is computed as follows:

$$RCI, w = \int_{-\infty}^{\infty} \frac{w2}{100}(10^z - M_w') W' dz,$$

Note that in the above definite integrals the limits of integration are the widest possible for the sake of generality; however, in reality the function is only integrated over a finite range for which data is acquired, considering the function in the rest of the non-acquired range to be 0. Also, by the manner in which W' is obtained, it is possible that W' is a discontinuous function, and the above integrations need to be done piecewise.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

Preparation of Supported Catalyst Example 1 (Zr complex):

Silica support (Davison 948, calcined at 610° C.) was contacted with MAO (30 wt % in toluene, Albemarle) to prepare D948-SMAO (MAO=6 mmol/g Al). D948-SMAO (1.00 g) was stirred as a slurry in 20 mL of toluene using a Cel-Stir vessel. 40 mg of zirconium complex 1 was dissolved in 5 mL of toluene and dropwise via digital pipette to the stirred slurry of D948-SMAO over 20 min to afford 0.04 mmol/g catalyst loading. The slurry was stirred for 1 hour at 25° C., then collected on a glass filter frit. The solids were washed with toluene (10 mL), pentane (10 mL), then were dried under high vacuum for 2 hours. Preparation of Supported Catalyst Example 2 (Hf complex):

Silica support (Davison 948, calcined at 610° C.) was contacted with MAO (30 wt % in toluene, Albemarle) to prepare D948-SMAO (MAO =6 mmol/g Al). D948-SMAO (1.00 g) was stirred as a slurry in 20 mL of toluene using a Cel-Stir vessel. 42 mg of hafnium complex 2 was dissolved in 5 mL of toluene and dropwise via digital pipette to the stirred slurry of D948-SMAO over 20 min to afford 0.04 mmol/g catalyst loading. The slurry was stirred for 1 hour at 25° C., then collected on a glass filter frit. The solids were washed with toluene (10 mL), pentane (10 mL), then were dried under high vacuum for 2 hours.

High Throughput Experimentation Process Details

Procedure for catalyst examples 1-4, tables 1-7, FIGS. 1-8. Polymerizations were carried out in using a high throughput parallel pressure reactor system, as previously described in U.S. Pat. Nos. 6,306,658, 6,455,316, and 6,489,168. Supported metallocene catalysts on silica were prepared as slurries in toluene or isohexane and were added to the reactor wells containing isohexane reaction solvent and a specific amount of scavenger, tri-n-octylaluminum, $Al(C_8H_{17})_3$. Ethylene blend gas containing 300 ppm hydrogen (Air Liquide) was added at a specific pressure, optionally, with hexene and/or octene comonomer. The reactions were controlled either by time or in some cases by a predetermined pressure consumption of ethylene monomer. The total volume of monomers, solvent, metallocene catalyst, activator, and scavenger was maintained at 5.1 ml. The reactions were terminated with addition of instrument air or $CO_2$ (100 psi overpressure), then cooled to ambient temperature and volatiles removed under reduced pressure. Polymer was characterized by previously described procedures.

TABLE 1

Process Conditions for High-Throughput Experimentation (HTE) Slurry Ethylene-Hexene Copolymerizations.

| Temp | Reactor Pressure | $C_2PP$ | $C_6$, μl | $^iC_6$ μl | $C_6:C_2$ vapor | $C_6:C_2$ liquid |
|---|---|---|---|---|---|---|
| 40° C. | 180 psi | 180 psi | 768 | 4032 | 0.00663 | 0.5705 |
| 50° C. | 180 psi | 180 psi | 655 | 4145 | 0.00831 | 0.5698 |
| 60° C. | 180 psi | 176 psi | 635 | 4165 | 0.00159 | 0.6403 |
| 70° C. | 180 psi | 170 psi | 490 | 4310 | 0.01270 | 0.5700 |
| 80° C. | 180 psi | 162 psi | 426 | 4374 | 0.01549 | 0.5702 |
| 90° C. | 180 psi | 152 psi | 369 | 4431 | 0.01874 | 0.5696 |

TABLE 2

Ethylene: 1-hexene HTE slurry copolymerizations. Conditions: 0.45 mg catalyst, isohexane solvent (total volume 5 ml), temperature range 40-90° C., reactor pressure 180 psi. Rapid Characterization data (FTIR, GPC, DSC).

| Example | Temp ° C. | C6 (μL) | C6 wt % | Mn | Mw | Mw/Mn | Rapid DSC Tm, ° C. | Quench time (sec) | yield (g) | Productivity (g/g-h) |
|---|---|---|---|---|---|---|---|---|---|---|
| 1A | 40° C. | 768 | 16.9 | 4,068 | 13,384 | 3.3 | 80.8 | 604 | 0.0930 | 1,231 |
| 1B | 50° C. | 655 | 17.9 | 3,755 | 9,158 | 2.4 | 85.9 | 228 | 0.1080 | 3,789 |
| 1C | 60° C. | 635 | 16.7 | 3,645 | 9,020 | 2.5 | 79.2 | 360 | 0.0960 | 2,135 |
| 1D | 70° C. | 490 | 18.3 | 3,428 | 7,478 | 2.2 | 88.8 | 332 | 0.1100 | 2,647 |
| 1E | 80° C. | 426 | 13.4 | 3,382 | 6,646 | 2.0 | 87.0 | 886 | 0.1140 | 1,029 |
| 1F | 90° C. | 369 | 16.4 | 3,340 | 7,230 | 2.2 | 90.5 | 1069 | 0.1050 | 786 |
| 2A | 40° C. | 768 | 18.5 | 174,834 | 463,925 | 2.7 | 115.3 | 3601 | 0.0220 | 48.9 |
| 2B | 50° C. | 655 | 19.1 | 292,842 | 613,863 | 2.1 | 74.4 | 2986 | 0.0570 | 152.7 |
| 2C | 60° C. | 635 | 11.4 | 245,059 | 585,468 | 2.4 | 115.0 | 3600 | 0.0290 | 64.4 |
| 2D | 70° C. | 490 | 18.8 | 330,651 | 687,596 | 2.1 | 78.3 | 1363 | 0.0890 | 522.3 |
| 2E | 80° C. | 426 | 17.3 | 334,334 | 642,619 | 1.9 | 87.4 | 1194 | 0.0940 | 629.9 |
| 2F | 90° C. | 369 | 14.1 | 350,062 | 629,911 | 1.8 | 104.4 | 3601 | 0.0870 | 193.3 |

TABLE 3

Figure 2:
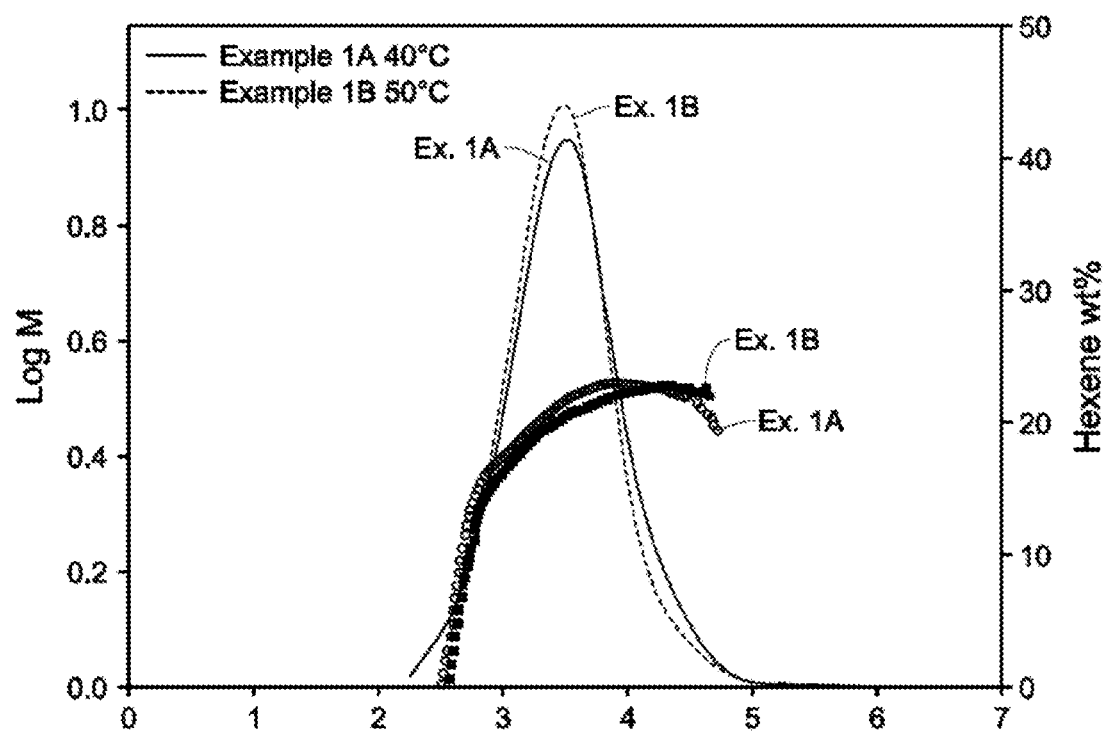
FIGS. 2-5 illustrate the effect of temperature on the BOCD character of the supported catalysts in high throughput slurry polymerizations.
Figure 3:
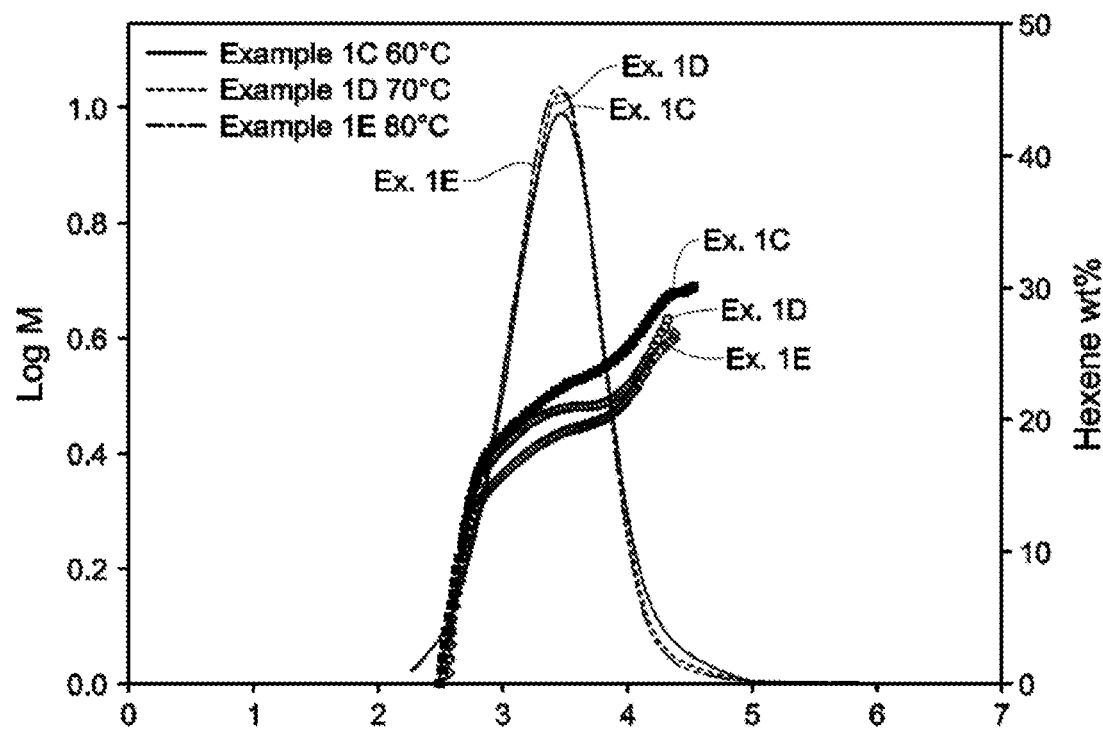

GPC-SCB data for Catalyst 1 HTE slurry polymerizations (FIG. 2 and FIG. 3).

| Catalyst | Temp | Mn | Mw | Mz | Mw/Mn | wt % $C_6$ | RCIm |
|---|---|---|---|---|---|---|---|
| 1A | 40° C. | 1,810 | 6,397 | 70,885 | 3.53 | 19.37 | 0.53 |
| 1B | 50° C. | 1,695 | 5,158 | 48,500 | 3.04 | 18.05 | 1.89 |
| 1C | 60° C. | 1,685 | 4,780 | 50,372 | 2.84 | 20.89 | 3.67 |
| 1D | 70° C. | 1,654 | 4,282 | 45,257 | 2.59 | 17.19 | 1.84 |
| 1E | 80° C. | 1,610 | 3,878 | 25,711 | 2.41 | 18.82 | 1.28 |

TABLE 4

Figure 4:
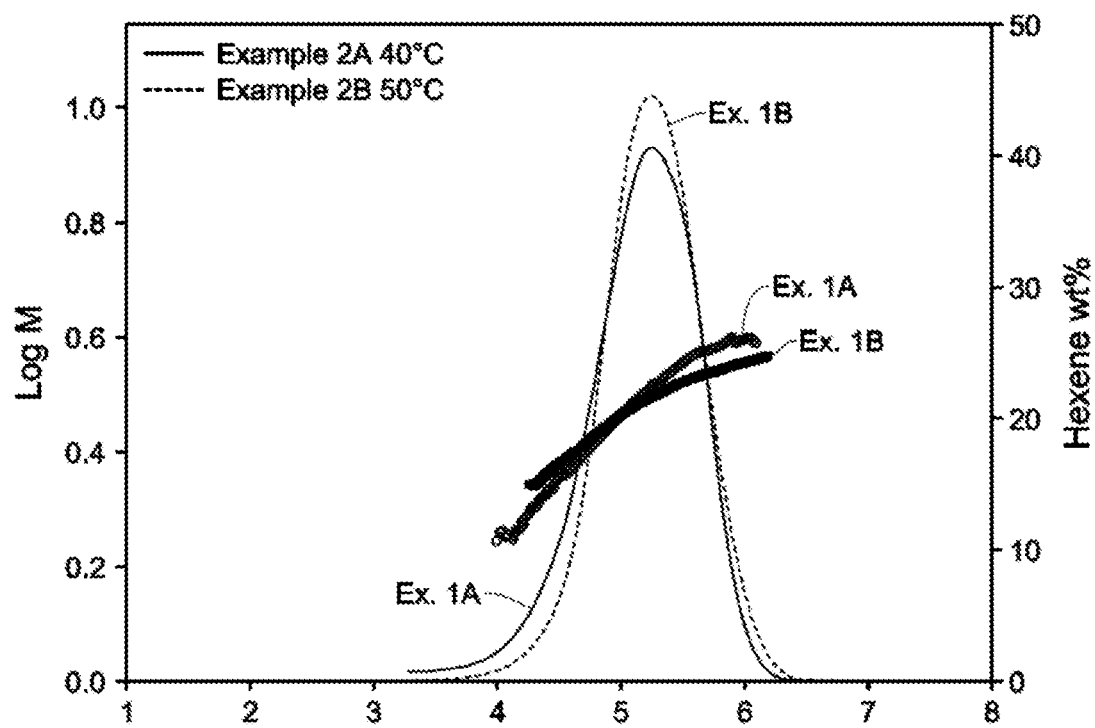
Figure 5:
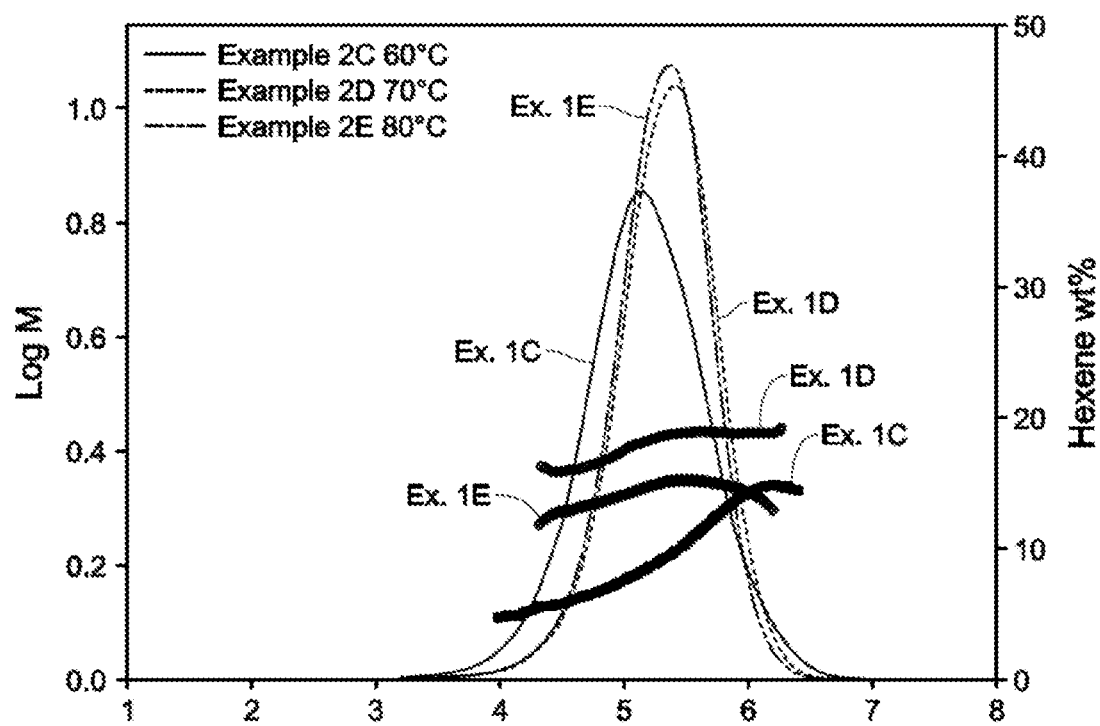
Figure 6A:
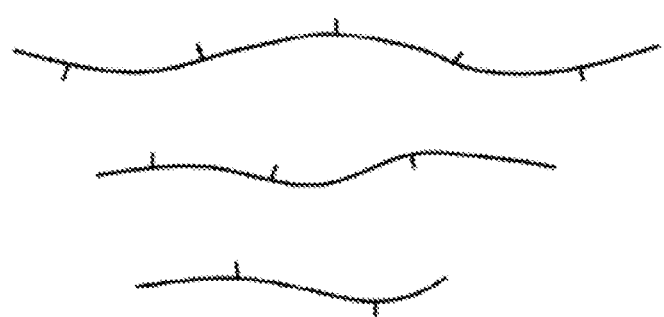
FIG. 6a is an illustration of a polyolefin with narrow composition distribution (NCD).
Figure 6B:
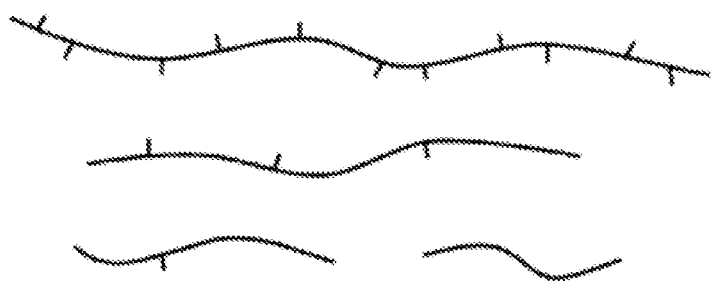
FIG. 6b is an illustration of a polyolefin with narrow composition distribution (NCD).

GPC-SCB data for Catalyst 2 HTE slurry polymerizations (FIG. 4 and FIG. 5).

| Catalyst | Temp | Mn | Mw | Mz | Mw/Mn | wt % $C_6$ | RCIm |
|---|---|---|---|---|---|---|---|
| 2A | 40° C. | 63,334 | 218,354 | 434,218 | 3.45 | 21.67 | 241 |
| 2B | 50° C. | 100,858 | 253,631 | 526,117 | 2.51 | 21.80 | 157 |
| 2C | 60° C. | 70,276 | 266,867 | 847,871 | 3.80 | 9.01 | 271 |
| 2D | 70° C. | 120,889 | 313,350 | 619,898 | 2.59 | 18.69 | 57 |
| 2E | 80° C. | 119,422 | 282,079 | 538,205 | 2.36 | 14.88 | 20 |

What is claimed is:

1. A polymerization process to produce a polyethylene polymer, the process comprising contacting a catalyst system comprising the product of a combination of one or more olefin polymerization catalysts, at least one activator, and at least one support, with ethylene and one or more $C_3$-$C_{10}$ alpha-olefin comonomers under polymerizable conditions including a temperature range of from 10° C. to 75° C., to produce the polyethylene polymer; wherein the polyethylene polymer has a broad orthogonal composition distribution (BOCD) and wherein the catalyst system comprises at least one non-metallocene olefin polymerization catalyst, wherein the one or more olefin polymerization catalysts comprises;

(A) a compound represented by Formula (I)

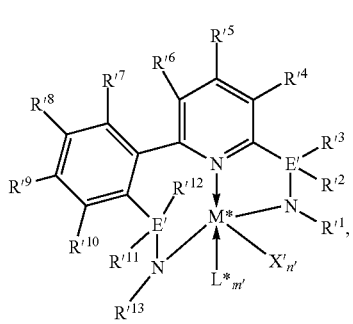

(I)

wherein:
M* is a Group 4 metal;
each E' group is independently selected from carbon, silicon, or germanium;
each X' is an anionic leaving group;
L* is a neutral Lewis base;
$R^{'1}$ and $R^{'13}$ are independently selected from the group consisting of hydrocarbyls, substituted hydrocarbyls, and silyl groups;
$R^{'2}, R^{'3}, R^{'4}, R^{'5}, R^{'6}, R^{'7}, R^{'8}, R^{'9}, R^{'10}, R^{'11}$, and $R^{'12}$ are independently selected from the group consisting of hydrogen, hydrocarbyls, alkoxy, silyl, amino, aryloxy, substituted hydrocarbyls, halogen, and phosphino;
n' is 1 or 2;
m' is 0, 1, or 2; and
two X' groups may be joined together to form a dianionic group;
two L* groups may be joined together to form a bidentate Lewis base;
an X' group may be joined to an L* group to form a monoanionic bidentate group;
$R^{'7}$ and $R^{'8}$ may be joined to form a ring; and
$R^{'10}$ and $R^{'11}$ may be joined to form a ring;
(B) a compound represented by Formula (III):

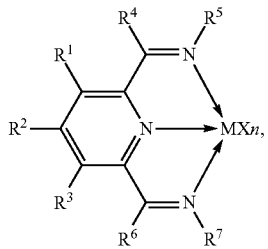

(III)

wherein:
M comprises a transition metal from Group 7, 8 or 9 of the Periodic Table of Elements;
X is an atom or group covalently or ionically bonded to the transition metal M;
n is 1, 2, 3, 4, or 5; and
$R^1$ to $R^7$ are independently selected from the group consisting of hydrogen, halogens, hydrocarbyls, and substituted hydrocarbyls, provided that when any two or more of $R^1$ to $R^7$ are hydrocarbyl or substituted hydrocarbyl, two or more may be linked to form one or more cyclic substituents; and combinations thereof;

(C) a compound represented by Formula (IV):

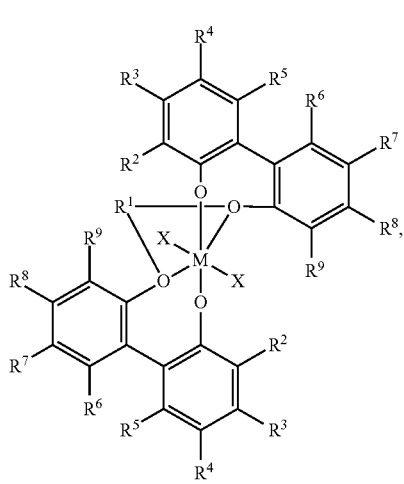

(IV)

wherein:
M is selected from the group consisting of Ti, Zr, and Hf;
each $R^1$ through $R^9$ is independently selected from the group consisting of hydride, hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, aralkylene, alkaryl, alkarylene, halide, haloalkyl, haloalkenyl, haloalkynyl, heteroalkyl, heterocycle, heteroaryl, heteroatom-containing group, silyl, boryl, phosphino, phosphine, amino, and amine; and X is a leaving group;
(D) a compound represented by Formula (V):

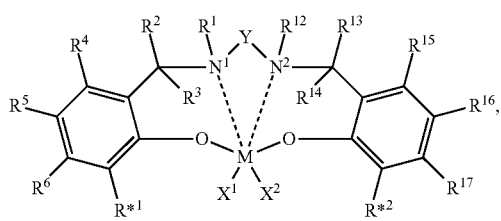

(V)

wherein: each solid line represents a covalent bond and each dashed line represents a coordinative link; wherein M is a Group 3, 4, 5, or 6 transition metal; $N^1$ and $N^2$ are nitrogen; O is oxygen; each of $X^1$ and $X^2$ is, independently, a univalent $C_1$ to $C_{20}$ hydrocarbyl radical, a functional group comprising elements from Groups 13 to 17, or $X^1$ and $X^2$ join together to form a $C_4$ to $C_{62}$ cyclic or polycyclic ring structure, provided however when M is trivalent $X^2$ is not present; each $R^1, R^2, R^3, R^4, R^5, R^6, R^{12}, R^{13}, R^{14}, R^{15}, R^{16}$, and $R^{17}$ is, independently, hydrogen, a $C_1$ to $C_{40}$ hydrocarbyl radical, a $C_1$ to $C_{40}$ substituted hydrocarbyl radical, two or more of $R^1, R^2, R^3, R^4, R^5, R^6, R^{12}, R^{13}, R^{14}, R^{15}, R^{16}$, and $R^{17}$ independently join together to form a $C_4$ to $C_{62}$ cyclic or polycyclic ring structure, or a combination thereof; wherein $R^{*1}$ and $R^{*2}$ independently comprise a bulky functional group, an electron withdrawing group, or a combination thereof; and Y is a divalent $C_1$ to $C_{20}$ hydrocarbyl radical;

(E) a compound represented by Formula (VI):

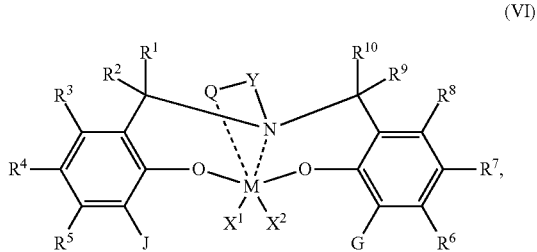

(VI)

wherein:
M is a Group 4 transition metal; $X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a C4 to C62 cyclic or polycyclic ring structure;

each $R^1$, $R^2$, $R^3$, $R^4$, $R^5$, $R^6$, $R^7$, $R^8$, $R^9$, and $R^{10}$ is independently a hydrogen, a $C_1$ to $C_{40}$ hydrocarbyl radical, a $C_1$ to $C_{40}$ substituted hydrocarbyl radical, a heteroatom or a heteroatom-containing group, or two or more of $R^1$ to $R^{10}$ may independently join together to form a $C_4$ to $C_{62}$ cyclic or polycyclic ring structure, or a combination thereof; Y is a divalent $C_1$ to $C_3$ hydrocarbyl; and Q is a neutral donor group;

J is a $C_7$ to $C_{60}$ fused polycyclic group, which optionally comprises up to 20 atoms from Groups 15 and 16, where at least one ring is aromatic and where at least one ring, which may or may not be aromatic, has at least five members; G is as defined for J or may be hydrogen, a $C_1$ to $C_{60}$ hydrocarbyl radical, a $C_1$ to $C_{60}$ substituted hydrocarbyl radical, a heteroatom or a heteroatom-containing group, or may independently form a $C_4$ to $C_{60}$ cyclic or polycyclic ring structure with $R^6$, $R^7$, or $R^8$ or a combination thereof; and/or (F) a compound represented by Formula (VII)

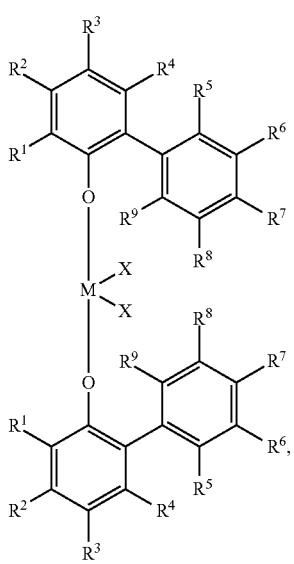

(VII)

wherein:
M is selected from the group consisting of Ti, Zr, and Hf; at least one of $R^1$ through $R^9$ is substituted with a moiety having the following structure (VIII):

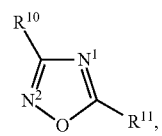

(VIII)

where structure (VIII) is attached at any one of $R^1$ through $R^9$ at the $R^1$ or $R^{11}$ position; at least one of nitrogen $N^1$ or $N^2$ of Structure (VIII) forms a dative bond with metal M; and each of $R^1$ through $R^{11}$ is independently selected from the group consisting of hydride, hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, alkaryl, halide, haloalkyl, haloalkenyl, haloalkynyl, heteroalkyl, heterocycle, heteroaryl, heteroatom-containing group, silyl, boryl, phosphino, phosphine, amino, and amine; X is a leaving group; and combinations thereof.

2. The process of claim 1, wherein the temperature range is from 10° C. to 70° C.

3. The process of claim 1, wherein the temperature range is from 10° C. to 65° C.

4. The process of claim 1, wherein the temperature range is from 20° C. to 60° C.

5. The process of claim 1, wherein the at least one activator comprises an alumoxane, an aluminum alkyl, an ionizing activator, or mixtures thereof.

6. The process of claim 1, wherein the at least one activator comprises methylalumoxane (MAO), modified methylalumoxane (MMAO), ethylalumoxane, isobutylalumoxane, alkylalumoxane, modified alkylalumoxane, or mixtures thereof.

7. The process of claim 1, wherein the at least one support comprises talc, clay, silica, alumina, silica-alumina, magnesia, zirconia, iron oxides, boria, calcium oxide, zinc oxide, barium oxide, thoria, aluminum phosphate gel, polyvinylchloride, substituted polystyrene, functionalized or crosslinked organic supports, polystyrene divinyl benzene, graphite, or mixtures thereof.

8. The process of claim 1, wherein the one or more olefin polymerization catalysts comprises a Group 3-6 transition metal.

9. The process of claim 8, wherein the one or more olefin polymerization catalysts comprises a Group 4 transition metal.

10. The process of claim 8, wherein the at least one activator comprises aluminum and an aluminum to transition metal ratio is at least 150 to 1.

11. The process of claim 8, wherein the at least one activator comprises aluminum and an aluminum to transition metal ratio is at least 250 to 1.

12. The process of claim 8, wherein the at least one activator comprises aluminum and an aluminum to transition metal ratio is at least 1,000 to 1.

13. The process of claim 1, wherein the catalyst system comprises two or more different olefin polymerization catalysts.

14. The process of claim 1, wherein the polymerization process is a gas phase fluidized bed, solution phase, and/or a slurry phase polymerization process.

15. The process of claim 1, wherein the polymerization process is a gas phase fluidized bed polymerization process and further comprises an inert condensing agent comprising n-butane, isobutane, n-pentane, neopentane, isopentane, n-hexane, isohexane, n-heptane, n-octane, or mixtures of thereof.

16. The process of claim 1, wherein the polyethylene polymer has a density of from 0.890 g/cm$^3$ to 0.950 g/cm$^3$.

17. The process of claim 1, wherein the polyethylene polymer has a density of from 0.910 g/cm$^3$ to 0.940 g/cm$^3$.

18. The process of claim 1, wherein the polyethylene polymer has a melt index ($I_2$) of from 0.10g/10 min to 10g/10 min.

19. The process of claim 1, wherein the polyethylene polymer has a melt index ($I_2$) of from 0.50 g/10 min to 7 g/10 min.

20. The process of claim 1, wherein the one or more olefin polymerization catalysts comprises a compound represented by Formula (I), wherein M* is hafnium, each E' group is carbon, each X' is an alkyl, aryl, hydride, alkylsilane, fluoride, chloride, bromide, iodide, triflate, carboxylate, or alkylsulfonate, each L* is a an ether, amine, or thioether, each $R'^1$ and $R'^{13}$ is an aryl group, $R'^7$ and $R'^8$ are is joined to form a six-membered aromatic ring with the joined $R'^7$ and $R'^8$ group being —CH=CHCH=CH-, and $R'^{10}$ and $R'^{11}$ may be a five-membered ring with the joined $R'^{10}R'^{11}$ group being —CH$_2$CH$_2$- or a six-membered ring with the joined R$^{10}$R$^{11}$ group being —CH$_2$CH$_2$CH$_2$.

21. The process of claim 1, wherein the one or more olefin polymerization catalysts comprises a compound represented by Formula (III) and n is 2 or 3.

22. The process of claim 1, wherein the one or more olefin polymerization catalysts comprises a compound represented by Formula (IV).

23. The process of claim 1, wherein the one or more olefin polymerization catalysts comprises a compound represented by Formula (VII).

24. The process of claim 1, wherein the one or more olefin polymerization catalysts further comprises:

(G) a compound represented by Formula (II):

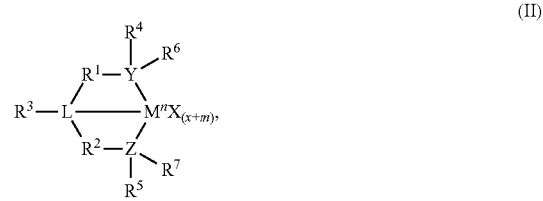

wherein:
M is a Group 3-12 transition metal or a Group 13 or 14 main group metal;
each X is independently an anionic leaving group;
n is the formal oxidation state of M;
m is the formal charge of the ligand comprising Y, Z, and L;
Y is a Group 15 element;
Z is a Group 15 element;
L is nitrogen;
$R^1$ and $R^2$ are independently a $C_1$ to $C_{20}$ hydrocarbon group, a heteroatom-containing group having up to twenty carbon atoms, silicon, germanium, tin, lead, phosphorus, or a halogen, where $R^1$ and $R^2$ may also be interconnected to each other;
$R^3$ is absent or a hydrocarbon group, hydrogen, a halogen, or a heteroatom-containing group;
$R^4$ and $R^5$ are independently an aryl group, a substituted aryl group, a cyclic alkyl group, a substituted cyclic alkyl group, a cyclic aralkyl group, a substituted cyclic aralkyl group or multiple ring system; and
$R^6$ and $R^7$ are independently absent, or hydrogen, halogen, heteroatom or a hydrocarbyl group.

25. The process of claim 24, wherein the one or more olefin polymerization catalysts comprises a compound represented by Formula (II), wherein M is zirconium or hafnium, n is +3, +4, or +5, m is 0, -1, -2 or -3, L is nitrogen; Y is nitrogen or phosphorus, Z is nitrogen or phosphorus, $R^1$ and $R^2$ are a $C_2$ to $C_{20}$ alkylene, arylene, or aralkylene group, $R^3$ is absent, a linear, cyclic or branched alkyl $C_1$ to $C_{20}$ group, or hydrogen, $R^4$ and $R^5$ independently are a $C_1$ to $C_{20}$ hydrocarbon group, a $C_1$ to $C_{20}$ aryl group or a $C_1$ to $C_{20}$ aralkyl group, and $R^6$ and $R^7$ are independently a linear, cyclic or branched $C_2$ to $C_{20}$ alkyl group or absent.

* * * * *